(12) United States Patent
Medard et al.

(10) Patent No.: US 10,944,610 B2
(45) Date of Patent: *Mar. 9, 2021

(54) DECODING SIGNALS BY GUESSING NOISE

(71) Applicants: Massachusetts Institute of Technology, Cambridge, MA (US); National University of Ireland, Maynooth, Maynooth (IE)

(72) Inventors: Muriel Medard, Belmont, MA (US); Kenneth R. Duffy, Dublin (IE)

(73) Assignees: Massachusetts Institute of Technology, Cambridge, MA (US); National University of Ireland, Maynooth, Maynooth (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/765,083

(22) PCT Filed: Dec. 20, 2018

(86) PCT No.: PCT/US2018/066813
§ 371 (c)(1),
(2) Date: May 18, 2020

(87) PCT Pub. No.: WO2019/126510
PCT Pub. Date: Jun. 27, 2019

(65) Prior Publication Data
US 2020/0358643 A1 Nov. 12, 2020

Related U.S. Application Data

(63) Continuation-in-part of application No. 16/026,822, filed on Jul. 3, 2018, now Pat. No. 10,608,673.
(Continued)

(51) Int. Cl.
*H04L 27/26* (2006.01)
*H04L 27/01* (2006.01)
*H04L 1/00* (2006.01)

(52) U.S. Cl.
CPC .......... *H04L 27/2649* (2013.01); *H04L 1/005* (2013.01); *H04L 27/01* (2013.01)

(58) Field of Classification Search
CPC ..... H04L 27/01; H04L 27/2649; H04L 1/005; H03M 1/06; H03M 1/069; H03M 1/0617;
(Continued)

(56) References Cited

U.S. PATENT DOCUMENTS 6,511,280 B1 * 1/2003 Sammartino ..... H03M 13/1535
370/242
6,625,226 B1 * 9/2003 Gersho ................... G10L 19/24
375/222

(Continued)

OTHER PUBLICATIONS

International Preliminary Report on Patentability dated Jul. 2, 2020 for International Application No. PCT/US2018/066810; 8 Pages.
(Continued)

*Primary Examiner* — James M Perez
(74) *Attorney, Agent, or Firm* — Daly, Crowley, Mofford & Durkee LLP

(57) ABSTRACT

Devices and methods described herein decode a sequence of coded symbols by guessing noise. In various embodiments, noise sequences are ordered, either during system initialization or on a periodic basis. Then, determining a codeword includes iteratively guessing a new noise sequence, removing its effect from received data symbols (e.g. by subtracting or using some other method of operational inversion), and checking whether the resulting data are a codeword using a codebook membership function. In various embodiments, soft information is used to generate a symbol mask that identifies the collection of symbols that are suspected to
(Continued)

differ from the channel input, and only these are subject to guessing. This decoder embodies or approximates maximum likelihood (optionally with soft information) decoding for any code. In some embodiments, the decoder tests abounded number of noise sequences, abandoning the search and declaring an erasure after these sequences are exhausted.

21 Claims, 14 Drawing Sheets

Related U.S. Application Data

(60) Provisional application No. 62/609,765, filed on Dec. 22, 2017, provisional application No. 62/631,104, filed on Feb. 15, 2018.

(58) Field of Classification Search
CPC .. H03M 1/0675; H03M 1/0687; H03M 13/00; H03M 13/11; H03M 13/1102; H03M 13/1105; H03M 13/1111; H03M 13/1125; H03M 13/37–3792; H03M 13/2951; H03M 13/1128; H03M 13/29; H03M 13/2903; H03M 13/2927; H03M 13/2933–2951
See application file for complete search history.

(56) References Cited

U.S. PATENT DOCUMENTS

| | | | | |
|---|---|---|---|---|
| 7,209,867 | B2* | 4/2007 | Vigoda | G06J 1/00 |
| | | | | 702/189 |
| 7,860,687 | B2* | 12/2010 | Vigoda | G06J 1/00 |
| | | | | 702/189 |
| 8,851,382 | B2* | 10/2014 | Powers | G06K 7/1478 |
| | | | | 235/462.25 |
| 9,432,059 | B1* | 8/2016 | Sakamoto | H04L 25/03318 |
| 9,769,003 | B2* | 9/2017 | Bogdan | H04L 27/2695 |
| 10,311,243 | B2* | 6/2019 | Calmon | G06F 21/6209 |
| 10,491,432 | B1* | 11/2019 | Medra | H04L 1/0054 |
| 10,608,672 | B2* | 3/2020 | Medard | H03M 13/2927 |
| 10,608,673 | B2* | 3/2020 | Medard | H03M 13/05 |
| 2002/0046382 | A1* | 4/2002 | Yang | H03M 13/03 |
| | | | | 714/758 |
| 2002/0161560 | A1* | 10/2002 | Abe | H04L 25/0204 |
| | | | | 702/196 |
| 2006/0123277 | A1* | 6/2006 | Hocevar | H03M 13/618 |
| | | | | 714/704 |
| 2007/0011568 | A1* | 1/2007 | Hocevar | H03M 13/1148 |
| | | | | 714/758 |
| 2007/0041458 | A1* | 2/2007 | Hocevar | H04L 1/0057 |
| | | | | 375/260 |
| 2007/0086539 | A1* | 4/2007 | Hocevar | H03M 13/1188 |
| | | | | 375/267 |
| 2007/0188354 | A1* | 8/2007 | Vigoda | H03M 13/37 |
| | | | | 341/50 |
| 2009/0249159 | A1* | 10/2009 | Lee | H03M 13/1148 |
| | | | | 714/752 |
| 2010/0074319 | A1* | 3/2010 | Tseng | H03M 13/2948 |
| | | | | 375/232 |
| 2010/0223534 | A1* | 9/2010 | Earnshaw | H03M 13/1505 |
| | | | | 714/780 |
| 2011/0072330 | A1* | 3/2011 | Kolze | H04L 1/0071 |
| | | | | 714/758 |
| 2014/0146969 | A1* | 5/2014 | Sadot | H04K 1/006 |
| | | | | 380/256 |
| 2015/0236726 | A1* | 8/2015 | Sankaranarayanan | H03M 13/1111 |
| | | | | 714/780 |
| 2017/0134193 | A1* | 5/2017 | Sugihara | H04L 1/0054 |
| 2018/0254882 | A1* | 9/2018 | Bogdan | H03L 7/0995 |
| 2019/0199377 | A1* | 6/2019 | Medard | H04L 1/0054 |
| 2019/0199473 | A1* | 6/2019 | Medard | H03M 13/05 |
| 2020/0186172 | A1* | 6/2020 | Medard | H03M 13/2927 |
| 2020/0358643 | A1* | 11/2020 | Medard | H04L 1/005 |

OTHER PUBLICATIONS

International Preliminary Report on Patentability dated Jul. 2, 2020 for International Application No. PCT/US2018/066813; 8 Pages.
Azar, et al.; "On the Equivalence Between Maximum Likelihood and Minimum Distance Decoding Binary Contagion and Queue-Based Channels with Memory;" IEEE Transactions on Communication; vol. 63; No. 1; Jan. 2011; 10 pages.
Duffy, et al.' "Capacity-achieving Guessing Random Additive Noise Decoding (GRAND)"; arXiv:1802.07010v4; Cornell University Library; Feb. 20, 2018; 21 Pages.
Kavcic, et al.; "The Viterbi Algorithm and Markov Noise Memory"; IEEE Transactions on Information Theory; vol. 46; No. 1; pp. 291-301; Jan. 1, 2000; 11 Pages.
PCT International Search Report dated Apr. 4, 2019, for Application No. PCT/US2018/066810; 5 Pages.
PCT Written Opinion of the International Searching Authority dated Apr. 4, 2019, for Application No. PCT/US2018/066810; 9 Pages.
U.S. Appl. No. 16/026,811, filed Jul. 3, 2018, Medard, et al.
U.S. Appl. No. 16/026,822, filed Jul. 3, 2018, Medard, et al.
PCT International Search Report dated Apr. 4, 2019, for Application No. PCT/US2018/066813; 5 Pages.
PCT Written Opinion of the International Searching Authority dated Apr. 4, 2019, for Application No. PCT/US2018/066813; 9 Pages.
Response to Office Action dated Aug. 14, 2019 for U.S. Appl. No. 16/026,811 as filed on Oct. 4, 2019; 5 Pages.
Office Action dated Oct. 28, 2019 for U.S. Appl. No. 16/026,822; 11 pages.
Response to Office Action dated Oct. 28, 2019 for U.S. Appl. No. 16/026,822, filed on Nov. 6, 2019; 2 pages.
Notice of Allowance dated Dec. 4, 2019 for U.S. Appl. No. 16/026,822; 5 pages.
Notice of Allowance dated Dec. 17, 2019 for U.S. Appl. No. 16/026,811; 7 pages.

* cited by examiner

Example 1

Example 2

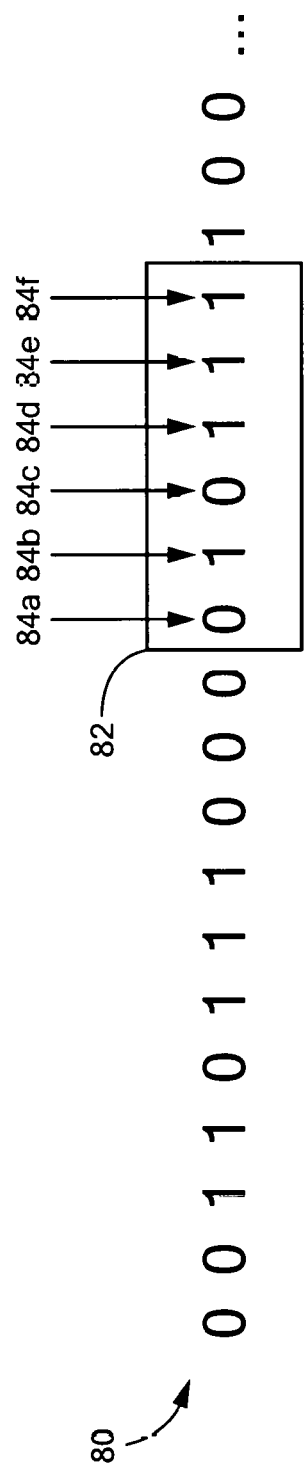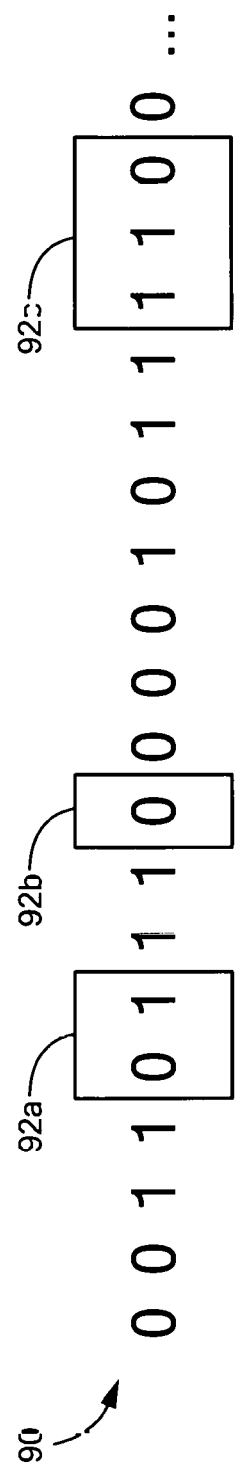
FIG. 8
FIG. 9

US 10,944,610 B2

DECODING SIGNALS BY GUESSING NOISE

CROSS REFERENCE TO RELATED APPLICATIONS

This application is a U.S. National Stage Application of PCT application number PCT/US2018/066813 filed in the English language on Dec. 20, 2018 and entitled "Decoding Signals By Guessing Noise", which claims the benefit of Provisional Application 62/609,765 filed Dec. 22, 2017 and Provisional Application 62/631,104 filed Feb. 15, 2018 and which is a continuation-in-part of U.S. application Ser. No. 16/026,822 filed Jul. 3, 2018 which claims the benefit of Provisional Application 62/609,765 filed Dec. 22, 2017 and Provisional Application 62/631,104 filed Feb. 15, 2018. The entire contents of these Applications are incorporated herein by reference.

BACKGROUND

As is known in the art, codes are known for processing information to produce representations of it for different purposes. Such representations, or encodings, may have one or more of the following goals: secrecy ("cryptography"), compression to reduce the resources required to represent given data ("source coding"), formatting for transmission over a physical medium ("line coding"), and encoding to enable detection and correction of errors, deletions and/or erasures, caused by unreliable storage or transmission mechanisms ("channel coding").

A channel may be a single physical medium or a series of interconnected media that take as input(s) some data represented in some format. Lack of fidelity in the channel's operation can result in channel output unintentionally differing from channel input. In the sequel, we shall collectively term channel effects that lead to the channel output differing from the channel input as noise, even when such effects may not be strictly physical noise. The effects of noise may be mathematically modeled, generally using a probabilistic method. Channel coding schemes generally operate by means of an alternate representation of the original information that includes some form of redundancy. Such redundancy to be stored or transmitted may consist, for example, of parity bits, checksums, linear transformations of the initial data over some algebraic field, or can be the result of applying a hash (bit-mixing) function. The result of applying channel coding to the original information is data termed a codeword that is the input to a channel. A codeword is an alternate representation of the initial information that suffices to recover the initial information. The collection of all possible codewords for a given parameterization of a given channel coding method is called its codebook. The purpose of channel codes is to allow a decoder to detect and/or correct channel noise in order to recover the coded input data and, often, the uncoded initial information.

Error/erasure correction and/or detection typically operates using an error-correction code ("ECC"), sometimes in combination with an automatic repeat request ("ARQ") requesting retransmission of additional data. Many types of ECCs exist, including: block codes that operate on information originally represented as fixed size data blocks and produce longer fixed-size data blocks, where the ratio of the input data block to the output data block is a dimensionless quantity generally termed the code's code rate, R, and if a block code is created by appending the additional redundancy to the original data such codes are called systematic codes; rateless codes that operate on bocks of data and transmit redundancy until acknowledgement of decoding is provided to the encoder; and sliding window codes, convolutional codes, and streaming codes that operate on streams of data. Several techniques exist that provide hybrid methods such as concatenated codes that combine block and convolutional codes, and Turbo codes that combine two or more convolutional codes. The design of codes is provided here in terms of examples, and is not exhaustive.

As is also known, decoding a channel output requires determination of which of the possible transmitted codewords from a codebook is the best candidate, or, in list decoding, which list of codewords from a codebook are the best candidates, for the encoded channel input. The process of decoding may or may not include the mapping from a codeword to its corresponding pre-encoded initial information. The form of decoding that is generally considered to be optimal is termed maximum likelihood (ML) decoding, wherein a codeword that as input to the channel maximizes the probability of observing the channel output is selected. Determining a ML decoding is generally considerably onerous and the design of codes is generally paired with the design of decoders that are not considered optimal. Decoders use a variety of techniques. Certain decoders provide a decoded codeword by determining the codeword in a codebook having the smallest Hamming distance (i.e. number of changed bits) when compared with the received data block, often by means of a proxy quantity such as a syndrome. Decoding a convolutional code requires applying to the channel output data algorithms, such as the Viterbi algorithm, that operate on a probabilistic basis rather than a deterministic one. Low-density parity-check codes (LDPCs) and Turbo codes are generally decoded by probabilistic methods such as message-passing (for LDPCs), or Turbo decoding (for Turbo codes), two techniques whose speeds of convergence are known in the art to be difficult to analyze. The discussion of decoders is provided here for the purpose of illustrating the general complexity associate with decoding in existing decoders, and the fact that decoders are generally specifically linked to the structure of the codes which they seek to decode. Thus, a decoding algorithm with good complexity properties that is capable of decoding many different types of codes is highly desirable and innovative.

The complexity of decoders affects speed of transmission and of data reads and thus many techniques seek to increase the speed of decoding. One means of doing so in hardware is through parallelizability of the algorithm, often implemented in programs as multiple threads, or multi-thread. The ability to parallelize standard decoding algorithms is often stymied by limited methods for doing so. Consequently, a decoding scheme that is readily parallelizable is beneficial and innovative.

The channel capacity, C, of a channel is the highest code rate, R, such that, for any arbitrarily small probability that a decoded codeword is not the transmitted codeword, a suitable codebook and decoding algorithm exists. For a broad class of noisy channels the Shannon-Hartley theorem identifies C as a function of channel noise, and establishes that a random block codebook and a maximum likelihood (ML) decoder ensures any arbitrarily small probability of decoding error for any R<C by increasing the length of the block code. Conversely, Fano's lemma states that when R>C it is generally not possible to provide a code for which the probability of error at the receiver is arbitrarily small. In this case, decoding can still occur, but no codebook and decoding algorithm exists that can ensure the likelihood that the decoded information is incorrect is arbitrarily small. Scant theoretical or practical results concerning the behavior of decoding algorithms in regimes where R>C exist and, when they do, they generally concern the lack of certainty afforded by the output of the decoder. Thus, having a decoding algorithm whose behavior in the R>C regime can be described and which can provide the correct decoding with some degree of certainty is novel and useful.

ML decoding, the preferred method, from the point of view of lowering probability of error, is generally excessively complex under existing proposed implementations and instead decoders generally rely on ad-hoc approaches to mapping the channel output to a candidate input codeword. The complexity of decoders, particularly in time and/or energy consumption, leads in the art to approaches to decoding that curtail the operation of decoding, particularly for convolutional codes. Such curtailing of decoding comes generally at the cost of performance in terms of the achievable rate. Hence, a decoding algorithm that allows curtailing, which will be termed abandonment in the sequel, while ensuring that a capacity can still be achieved, would be both desirable and inventive.

Current designs of codebook and decoder pairs generally rely on careful joint design to obtain good values of code rate for given channel characteristics in order to provide low decoding error probability. In many cases, these designs require codebook construction that presents drawbacks for delay, processing and memory. Designs that seek to manage such drawbacks include Polar codes, and so-called short length codes that are based on notions of encoding using methods akin to the Central Limit Theorem. Polar codes are specific and can only operate at certain lengths, while short length codes remain heretofore mostly in the theoretical domain without many approaches for constructing or decoding them. Random codes, which are capacity achieving when used with ML decoding, are challenging to decode using existing decoding schemes. The approach taken heretofore in the literature has been to establish the ML decoding by envisaging a computation for each and every possible codeword in the codebook in light of the channel output, a method that suffers from complexity that grows roughly proportionally with the number of codewords in the codebook. Note that, for a given code rate, the number of codewords increases exponentially with the length of the codes, and, for a given code length, the number of codewords increases, also exponentially, in the rate of the code, rendering ML decoding by this approach generally prohibitively complex. Since higher code rates are desirable for efficiency of data transmission or storage, this scaling is has a deleterious effect. Thus, a decoding method that provides ML decoding without the need for long codes, or provides ML decoding with complexity that does not grow or that decreases with code rate, would be new and advantageous.

In many systems, particularly in communication systems where the channel consists of one or more communication channels, there may be information available regarding the characteristics of the channel effects. Such information about the channel effects may be about their general nature of the noise or about the specific realization of the noise. Information about the general nature of the noise may include underlying structural behavior from such physical phenomena, such as fading, that may lead to clusters of noise, or characteristics of temporal evolution, often modeled in the art as Markov noise processes. Such information about the general behavior, though known to be beneficial in theory, is in practice sufficiently difficult to integrate into the types of decoding mechanisms mentioned above that it is not actively exploited. Instead, methods such as interleaving seek to remove or hide the potentially informative effect of temporal dependencies in the noise behavior, at the cost of longer codewords and attendant penalties in time and memory.

The second type of characteristics of the noise, concerning a specific realization of the noise affecting the channel, is often termed soft information. Such soft information can comprise instantaneous signal-to-noise ratio information, signal-to-interference ratio information, information regarding inter-symbol information (e.g. from a Rake receiver), information about possible noise behaviors (e.g. having noise being more likely at the end of a transmission, when timing information may be stale or approaching obsolescence), or the interplay between modulation and physical channel. Such soft information is often difficult to take into account in decoding schemes. Turbo decoding maintains certain soft information implicitly in its decoding process, but other schemes generally require bespoke modifications that add significant complexity. Thus, as for the general behavior of the noise, notwithstanding the development of theoretical improvements, current decoding schemes in general ignore the effect of soft information.

Thus decoding schemes that can readily and easily take into account general behavior of the noise or soft information, or both, particularly without resorting to such approaches as interleaving, would be novel and provide advantages with respect to the current state of the art.

SUMMARY OF DISCLOSED EMBODIMENTS

Devices and methods described herein decode a sequence of coded symbols by guessing noise. In various embodiments, noise sequences are ordered, either during system initialization or on a periodic basis. Then, determining a codeword includes iteratively guessing a new noise sequence, removing its effect from received data symbols (e.g. by subtracting or using some other method of operational inversion), and checking whether the resulting data are a codeword using a codebook membership function. In various embodiments, soft information is used to generate a symbol mask that identifies the collection of symbols that are suspected to differ from the channel input, and only these are subject to guessing. This decoder embodies or approximates maximum likelihood (optionally with soft information) decoding for any code. In some embodiments, the decoder tests a bounded number of noise sequences, abandoning the search and declaring an erasure after these sequences are exhausted. Abandonment decoding nevertheless approximates maximum likelihood decoding within a tolerable bound and achieves channel capacity when the abandonment threshold is chosen appropriately.

Systems, devices, and methods described herein decode any block code based on guessing channel effects that we collectively term noise. We term a noise sequence the collection of noise effects affecting a channel input sequence, such as a codeword, to create a channel output. In various embodiments, noise sequences are ordered according to their likelihoods, either during system initialization or on an ongoing basis.

In some embodiments, the decoder incorporates soft information that indicates, for all or some subset of symbols in the plurality of received symbols that form the channel output, a measure of confidence that the respective symbol was received without error.

In some embodiments, the measure of confidence is a function of any combination of instantaneous signal-to-noise ratio information, signal-to-interference ratio information, multiple-user collision information, information regarding inter-symbol information (e.g. from a Rake receiver), information about possible noise behaviors (e.g. having noise being more likely at the end of a transmission, when timing information may be stale or approaching obsolescence), the interplay between modulation and physical channel, clock drift, multipath profiles (e.g. derived from a Rake receiver or a decision feedback equalizer), inter-symbol interference, or other effects in media for communications, rendering or storage.

In some embodiments, the decoder uses soft information for a given channel output to generate a symbol mask that identifies the collection of symbols that are suspected to differ from the channel input.

Determining a codeword includes guessing a noise sequence in order, possibly after application of one or more masks that curtail the noise sequences to be queried, inverting its effect from a channel output (e.g. by subtracting or otherwise removing via some method of operational inversion), and determining whether the resulting data corresponds to a codeword contained in a codebook through use of a codeword validator. For a given noise sequence order, this process is deterministic, has bounded complexity, and, when used in conjunction with a random codebook, is capable of approaching channel capacity. Moreover, inverting a noise sequence from a channel output does not require computations based on the codebook (e.g. syndrome computations) so that decoding operations (e.g. decoding calculations) may advantageously be separated from determining codeword membership in a codebook.

In some embodiments, generating the symbol mask includes selecting the function of the soft information to reduce an algorithmic complexity of forming the symbols by inverting the noise effect.

In some embodiments, generating the symbol mask includes selecting the function of the soft information to increase the probability that the decoded codeword corresponds to the initial information.

In some embodiments, generating the symbol mask includes selecting the function of the soft information to increase capacity of the data channel.

In some embodiments, generating the symbol mask includes generating a plurality of symbol masks with each such symbol mask reflecting the modulation schemes used in the physical medium used to store or transmit the data. In such embodiments, each such block of symbols consists of symbols having a corresponding different number of bits. Moreover, in such embodiments, obtaining the termination condition includes obtaining if any of the formed blocks of symbols is a codeword.

In some embodiments, generating the symbol mask includes generating it as a function of a channel model. In such embodiments, generating the symbol mask may include generating as a function of a type of channel modulation, or inter-symbol interference, or additive noise, or timing slippage information.

In embodiments, the decoder further includes a sent codeword outputter configured to output a codeword. In embodiments, the codeword validator is configured to obtain a termination condition and in response to the termination condition, the sent codeword outputter outputs a formed block of symbols as a decoded codeword.

In some embodiments, obtaining the termination condition includes obtaining if a number of guesses reaches a given threshold before the formed symbols comprises a codeword. Some such embodiments may further include, in response to obtaining the termination condition, outputting an error signal. Some such embodiment may further include, alternately or in addition, generating, as a function of the soft information, a new symbol mask that identifies a second subset of the plurality of symbols to be guessed. A decoder provided in accordance with the concepts described herein also is advantageously modular and suitable for use with any codebook. By guessing noise sequences, possibly after the application of one or more masks, and inverting the noise effects on channel outputs, no code-dependent decoding mechanism, such as syndrome decoding, message passing, polarization or Turbo decoding, is required. Rather, the decoder interacts with the codebook by way of requesting whether a given sequence of guessed-noise-adjusted symbols is or is not a codeword, or obtaining some other information regarding codebook membership of the given sequence of guessed-noise-adjusted symbols.

Thus, such a decoder can be used in conjunction with any existing codebook construction including, for example, a random codebook, a random linear codebook (in which a codeword is generated from a plurality of symbols by multiplying that plurality, expressed as an ordered sequence over some algebraic ring, by a set of coefficients, over the same ring or some compatible ring, which set of coefficients, or subset thereof, are chosen through some random process), a standard linear codebook (Hamming Code-book, Reed-Muller, Reed-Solomon, convolutional, Low Density Parity Check (LDPC), Polar, etc.), as well as any forthcoming codebook construction.

The separation of functions between guessed-noise-adjusted codeword and its membership of the codebook simplifies the decoder design and permits use with codebooks unknown by the module guessing the noise, which is possibly passed through one or more masks, to be used, if desired. This feature presents multiple advantages. For example, an array of parallel decoders may avail themselves of a single codebook membership module. In another example, security could be enhanced by the compartmentalization enabled by removing the requirement that the decoder know the codebook, thus allowing the codebook and the data being recovered to remain hidden from the parts of the system performing the noise guessing. In another example, the codebook may change after some number of channel uses without the guess decoder altering its operation, enabling codebook hopping security measures.

In accordance one aspect of the concepts described herein, a decoder includes a noise sequence guesser configured to select, according to a noise guessing order, and possibly according to one or more masks applied to the noise sequence, a previously unselected sequence of noise symbols, a means for inverting a noise effect of the selected noise sequence on the received plurality of symbols to form data represented as a block of symbols, a buffer configured to have stored therein the block of symbols, and a codeword validator configured to validate whether a formed block of symbols corresponds to a codeword. With this particular arrangement, a decoder for decoding as a codeword a plurality of symbols representing the output or a channel is provided.

With this arrangement, a decoding method suitable for use with any codebook is provided. Such a method finds use as a decoder that receives symbols over a noisy data channel. In embodiments, inverting a noise effect of the selected sequence of noise symbols, possibly after application of one or more masks, on the received plurality of symbols forms a block of symbols. In embodiments, the block of symbols may be formed in a buffer. In embodiments, the decoding processing may include repeatedly selecting a sequence of previously unselected noise symbols, possibly after application of one or more masks, and inverting a noise effect of the selected sequence of noise symbols until a termination condition is obtained. In embodiments, the termination condition is obtained if a formed block of symbols corresponds to a codeword.

In embodiments, in response to obtaining the termination condition, the method outputs the formed block of symbols as the decoded codeword.

In accordance with a still further aspect of the concepts and techniques described herein, a method, in a decoder, of decoding as a codeword a plurality of symbols received from a data sender using a noisy medium. The method includes repeatedly performing three processes until a termination condition is obtained. The first process is selecting, by a noise guesser according to a noise guessing order, a noise sequence, possibly after application of one or more masks, previously unselected for the received plurality of symbols that is the channel output. The second process is forming, in a buffer, a block of symbols by inverting a noise effect, possibly after application of one or more masks, of the selected noise sequence on the received plurality of symbols. The third process is obtaining the termination condition, by a codeword validator, if the formed block of symbols is a codeword. In response to obtaining the termination condition, the method requires outputting, by a sent codeword outputter, the formed block of symbols as the decoded codeword.

In some embodiments, selecting according to the noise guessing order comprises selecting noise sequences according to a maximum likelihood order. The maximum likelihood order may be determined according to a probabilistic model. This probabilistic model may take into account extrinsic information or soft information. Some embodiments include determining the noise guessing order by measuring one or more characteristics of the noisy channel that include: instantaneous signal-to-noise ratio information, signal-to-interference ratio information, multiple-user collision information, information regarding inter-symbol information (e.g. from a Rake receiver), information about possible noise behaviors (e.g. having noise being more likely at the end of a transmission, when timing information may be stale or approaching obsolescence), the interplay between modulation and physical channel, clock drift, multipath profiles (e.g. derived from a Rake receiver or a decision feedback equalizer), inter symbol interference, or other effects in media for communications, rendering or storage. Some embodiments include determining the noise guessing order according to machine learning.

In some embodiments, selecting according to the noise guessing order comprises selecting according to information provided by the data sender regarding a pattern of noise mixed with the codeword by the data sender. In some embodiments, inverting the noise effect comprises subtracting or dividing the selected noise sequence, possibly after application of one or more masks, from the received sequence of symbols. The codeword may be contained in a random codebook (e.g. random linear codebook), an algebraic block code (e.g. a Hamming codebook or a Reed-Solomon codebook), a LDPC codebook, a Turbo codebook, a convolutional codebook, a concatenated codebook, a rateless codebook, a Polar codebook, or any other type of codebook.

In some embodiments, obtaining the termination condition further comprises validating, by the codeword validator, the formed block of symbols using one or more of: validation information received from the data sender, a codebook memory (e.g. a memory having some or all portions of a codebook stored therein), a function taking the formed block of symbols as input and having an output that relates to membership of the block of symbols to a codebook, and a codebook oracle. Some embodiments further include, in response to obtaining the termination condition, outputting, by a noise outputter, the selected noise sequence.

Some embodiments further include storing, by the codeword validator, in a storage as a list, a totality or a subset of formed block of symbols that map to a codeword. In such embodiments, obtaining the termination condition further includes determining, by the codeword validator, that the stored list includes a given number of codewords; and outputting, by the sent codeword outputter, further comprises outputting the stored list.

Some embodiments perform the method simultaneously by each of a plurality of parallel or distributed decoders on the block of symbols received from the data sender. Each parallel or distributed decoder may consider only some subset of the noise sequences, possibly passed through one or more masks. In some embodiments, these subsets of noise sequences, possibly passed through one or more masks, may be disjoint, thus dividing the work of noise guessing among the decoders. In another embodiment, the sets of noise sequences, possibly passed through one or more masks, may not be disjoint, and only the output of the first decoder is used. In an alternate embodiment, multiple decoders may decode, according to different likelihoods on the noise sequences possibly passed through one or more masks. In another embodiment, different decoders may use different masks for the noise sequences. These embodiments may be combined.

Some embodiments perform approximate maximum likelihood (AML) decoding by incrementing a repetition count when (possibly each time) the codeword validator attempts to validate a block of symbols formed in the buffer and obtaining the termination condition by the codeword validator when the repetition count reaches a first threshold. Such an AML decoder may be capacity achieving. Instead of a repetition count, the codeword validator may terminate when the probability of the decoded codeword or list of codewords being correct is high enough relative to some threshold.

In some AML embodiments, outputting, by the sent codeword outputter, comprises outputting either or both of an error signal and diagnostic information pertaining to an error.

Some AML embodiments include storing, as a list in a codeword memory, formed blocks of symbols that are a codeword, and outputting, by the sent codeword outputter, the stored list.

In some AML embodiments, obtaining the termination condition includes determining that the repetition count has reached at least a second threshold that is a function of a codebook rate, an estimated noise property, a desired error probability, or other property of the decoding. In some AML embodiments, obtaining the termination condition further comprises determining that the code rate R is greater than the channel capacity C owing to a temporary decrease in channel capacity (e.g. owing to transient noise).

In some AML embodiments, obtaining the termination condition further comprises the codeword validator declaring an erasure.

While embodiments have been summarized above in terms of a method, it is appreciated that other embodiments include corresponding machines, devices and articles of manufacturer (including tangible computer-readable media in which are non-transitorily stored executable instructions). All of such machines, devices and articles of manufacturer include provide various aspects and advantages described herein.

Another AML embodiment is a different method, in a decoder, of decoding as a codeword a plurality of symbols received from a data sender using a noisy medium or channel. This alternate embodiment uses a symbol mask determined using information regarding the nature of the noise to narrow the symbols that require guessing, thereby reducing the complexity of the guessing algorithm. The method thus includes repeatedly performing three processes until a termination condition is obtained. The first process is selecting, by a noise guesser according to a noise guessing order, a sequence of noise symbols, possibly after application of one or more masks, previously unselected for the received plurality of symbols. The second process is forming symbols by inverting a noise effect of the selected sequence of noise symbols on the received plurality of symbols. The third process is obtaining the termination condition, by a codeword validator, if the formed symbols comprise a codeword. In response to obtaining the termination condition, the method requires outputting, by a sent codeword outputter, the comprised codeword.

It is appreciated that the concepts, techniques, and structures disclosed herein may be embodied in other ways, and that the above-described embodiments are merely exemplary.

BRIEF DESCRIPTION OF THE DRAWINGS

The manner and process of making and using the disclosed embodiments may be appreciated by reference to the drawings, in which:

FIG. 8 is a representation of a symbol mask as applied to a bit stream in accordance with an embodiment;

FIG. 9 is a representation of a different symbol mask as applied to the bit stream in accordance with an embodiment;

DETAILED DESCRIPTION OF ILLUSTRATIVE EMBODIMENTS

In this specification, including the appended claims, the following quoted terms shall have the indicated meanings, except where expressly indicated otherwise:

"Data block" (or "block") means a sequence of symbols with each symbol comprising one or more bits.

"Data channel" (or "channel") means a medium or plurality of coupled media for communicating data (e.g. data blocks) between one or more data senders and one or more data receivers.

"Codebook" means a collection of strings of symbols, or a description of such a collection of strings, shared between a data sender and a data receiver.

"Codeword" means a string of symbols pertaining to the codebook.

"Oracle" or "codeword validator" for a codebook means a function or mechanism that enables a device to determine whether any given sequence of symbols is a codeword in the codebook.

"Channel input" means a codeword sent by a data sender into a medium. "Channel output" means a corresponding string received by a data receiver from the channel.

"Noise" means an effect caused by transient passage of a channel input through a medium that results in a channel input being different than the corresponding channel output.

"Noise function" means a function that computes a channel output by invertibly combining a channel input codeword and a noise sequence.

When applied to a noisy channel, "memoryless" means that the noise function is such that each element of the noise sequence is determined independently and "memory" means that the noise function is not memoryless.

A "binary symmetric channel" (or "BSC") is a memoryless channel that is binary (useful signals are encoded using bits) and symmetric (the probability that a bit is altered by noise does not depend on the value of the bit).

"Soft information" means information about the transmission characteristics of a medium, and may include, but is not limited to, instantaneous signal-to-noise ratio information, signal-to-interference ratio information, information regarding inter-symbol information (e.g. from a Rake receiver), information about possible noise behaviors (e.g. having noise being more likely at the end of a transmission, when timing information may be stale or approaching obsolescence), or the interplay between modulation and physical channel, or a count of how many tries of decoding have been attempted on a particular channel.

A "symbol mask" or "mask" is a selector of certain symbols within a sequence of symbols. If each symbol in the sequence is encoded by a single bit, then a symbol mask is equivalent to a bit mask as is known in the art, however if each symbol is encoded by more than one bit, then each element of the symbol mask identifies multiple bits within the sequence.

A "submask" is a non-empty subset of a symbol mask. A mask may be comprised of two or more submasks and such submasks may be contiguous or non-contiguous within a symbol sequence.

Figure 1:
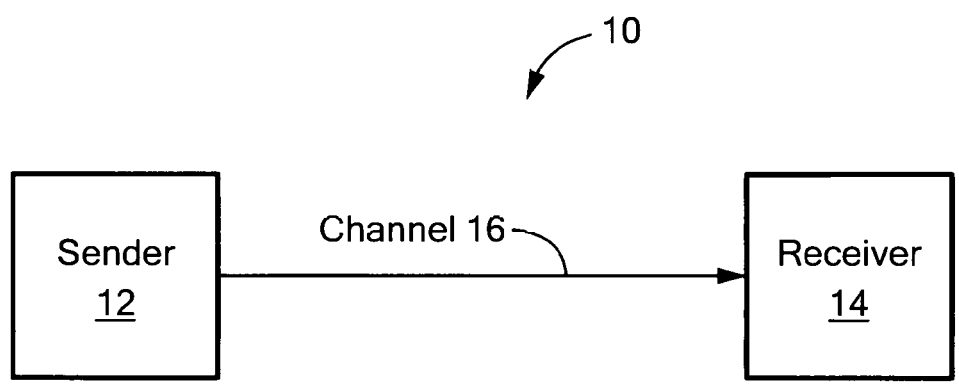
FIG. 1 is a schematic diagram of an illustrative system in which the concepts described herein may be practiced.

Referring now to FIG. 1, an illustrative, simplified environment in which the concepts and techniques described herein may be practiced includes a system 10 for communicating data packets between a sender 12 and a receiver 14 using a data channel 16. The sender 12 may be any device capable of communicating data packets to another device, using the data channel 16. Similarly, the receiver 14 may be any device capable of receiving data packets from another device using the data channel 16. The data channel 16 may be any channel known in the art for communicating data packets, including analog and digital channels, and combinations of such channels including the Internet. Sender 12 and receiver 14 each may have, for example, a structure that is the same as or like processing system 40 shown in FIG. 4.

In operation, the data sender 12 sends data toward the data receiver 14 using the data channel 16. The data receiver 14 can determine whether received data is valid. If the data receiver 14 receives invalid data, then it may assume that noise in the data channel 16 has corrupted the data sent by the data sender 12, and the data receiver 14 must correct the noise. Embodiments of the concepts described herein include systems, devices, and techniques for correcting that noise using the noise guessing techniques illustrated in the remaining Figures and as now described.

In general, the data channel 16 may be modeled using inputs $X^n$ and outputs $Y^n$, each comprising blocks of n symbols from a finite alphabet A of size $|A|$. It is assumed that the channel input sent by the data sender 12 toward the data receiver 14 is altered by random, not necessarily memoryless, noise, $N^n$, that is independent of the channel input and takes values in $B^n$. If the noise function $\oplus$ describing the channel's action operates as:

$$Y^n = X^n \oplus N^n, \quad (1)$$

and if this function is invertible, then an effect of the noise can be recovered, knowing the output and input, as:

$$X^n = Y^n \ominus N^n. \quad (2)$$

While these equations indicate that the noise function and its inverse are additive, it is contemplated that the noise function $\oplus$ may be more general, and may be, for example, multiplicative. Various embodiments of the concepts described herein require only that the noise function is invertible using a function $\ominus$.

The data sender 12 and data receiver 14 operate using a codebook $\mathcal{C}_n = \{c^{n,1}, \ldots, c^{n,M}{}_n\}$ having (or in some cases consisting of) $M_n$ codewords, or elements of $A^n$. The codebook may be extrinsically shared, in which case both the data sender 12 and the data receiver 14 store a copy of the codebook. Alternately, the codebook may be intrinsically shared, in which case both the data sender 12 and the data receiver 14 share an algorithm for determining whether a given element of $A^n$ is a codeword. In other embodiments, a fixed codebook or algorithm is not shared between the data sender 12 and data receiver 14 but is dynamically computed by the data receiver 14. For example, the block size n, the number of codewords $M_n$, or their values may be varied as a function of a signal-to-noise ratio measured by the data sender 12 or the data receiver 14. In other embodiments, the data receiver 14 does not have direct access to all codewords in the codebook and consults an external codebook oracle to determine whether a given sequence of symbols is a codeword.

For a given channel output $y^n$ received by the data receiver 14, denote the conditional probability of the received sequence for each codeword in the codebook by $$p(y^n | c^{n,i}) = P(y^n = c^{n,i} \oplus N^n) \text{ for } i \in \{1, \ldots, M_n\}. \quad (3)$$

The Maximum Likelihood ("ML") decoding is then an element of the codebook that has the highest conditional likelihood of transmission given what was received, $$c^{n,*} \in \operatorname{argmax}\{p(y^n | c^{n,i}) : c^{n,i} \in \mathcal{C}_n\} = \operatorname{argmax}\{P(N^n = y^n \ominus c^{n,i}) : c^{n,i} \in \mathcal{C}_n\}, \quad (4)$$

where the invertibility of the operation $\oplus$ has been used in the final equation.

In accordance with illustrative embodiments, a decoder in the data receiver 14 guesses noise. In one embodiment, the decoder rank-orders noise sequences from most likely to least likely, then sequentially queries whether the sequence that remains when the noise is removed from the received signal is an element of the codebook. The first result that matches the codebook corresponds to a Maximum Likelihood (ML) decoding.

More formally, the receiver first creates, over the alphabet B of the noise, an ordered list of noise sequences, G: $B^n \to \{1, \ldots, |B|^n\}$, from most likely to least likely, breaking ties arbitrarily:

$$G(z^{n,i}) \leq G(z^{n,j}) \text{ iff } P(N^n = z^{n,i}) \geq P(N^n = z^{n,j}), \quad (5)$$

where z is used as n denotes the code block-length. Then, for each received signal, the receiver executes the following process:

1. Given channel output $y^n$, initialize i=1 and set $z^n$ to be the most likely noise sequence, i.e. the $z^n$ such that $G(z^n)=i$.

2. While $x^n = y^n \ominus z^n \notin \mathcal{C}_n$, increase i by 1 and set $z^n$ to be the next most likely noise sequence, i.e. the $z^n$ such that $G(z^n)=i$.

3. The $x^n$ that results from this while loop is the decoded element.

In some embodiments, list decoding is realized by repeating the second and third steps in the above process, until a given number K of elements of the codebook are identified. This list then constitutes the K most likely transmitted codewords.

Table 1 below illustrates ML decoding by noise guessing. The data receiver 14 generates, or otherwise receives, an ordered list of noise symbols. For example, the receiver may generate a rank-ordered list from most likely to least likely breaking ties arbitrarily, $z^{n,1}$, $z^{n,2}$, and so on. The order may be based on measurements of data channel characteristics, such as a signal-to-noise ratio, an interference ratio, a change in a codeword error rate, or interference between multiple users. The noise guessing order may be determined before communication of meaningful data begins, or dynamically adapted in response to, for example, channel information, possibly using machine learning techniques known in the art.

TABLE 1

| Noise guessing order | 1 | 2 | 3 | 4 | 5 | 6 | ... |
|---|---|---|---|---|---|---|---|
| Noise from most likely to least likely | $z^{n,1}$ | $z^{n,2}$ | $z^{n,3}$ | $z^{n,4}$ | $z^{n,5}$ | $z^{n,6}$ | ... |
| String queried for membership of the codebook $C_n$ | $y^n \ominus z^{n,1}$ | $y^n \ominus z^{n,2}$ | $y^n \ominus z^{n,3}$ | $y^n \ominus z^{n,4}$ | $y^n \ominus z^{n,5}$ | $y^n \ominus z^{n,6}$ | ... |

TABLE 1-continued

| Location of codebook elements | $c^{n,i1}$ | $c^{n,i2}$ | ... |
|---|---|---|---|

In that order, given a received signal $y^n$, the data receiver 14 sequentially inverts the effect of the noise $z^{n,i}$ and queries if the string that results, $y^{n,j}$, is an element of the codebook $\mathcal{C}_n$. The first string that is identified to be in the codebook is a ML decoding. In this example $c^{n,i}_1$ is the first element of the codebook to be identified, which occurs on the third noise guess. It is appreciated that the first element of the codebook to be identified need not be selected.

The noise guessing approach described herein advantageously separates knowledge of the full codebook from codeword guessing in the decoder. Thus, the decoder only requires the ability to query membership of a string of symbols to a codebook, e.g. using a codebook oracle. This affords the security and module re-usability mentioned previously.

As several guesses may be performed concurrently, such as for noise sequences of the same probability, the guessing permits significant decoder speed gains through parallelization. Parallelizability in decoders is generally beneficial in terms of speed but difficult to implement, as mentioned in the background, so such ease of parallelizability is beneficial.

The ML decoder described above may be advantageously modified using the observation that once enough unsuccessful guesses have been made, it becomes probable that further guesses will not result in successful decoding. In this case, the data receiver 14 optionally may perform an Approximate Maximum Likelihood ("AML") decoding in which the decoder abandons guessing after some number of noise-guess inversion queries and declares an error, which may be implemented as an erasure. Early termination further bounds the complexity of the algorithm.

Different options exist for setting the AML abandonment threshold, which is a type of curtailing, as discussed previously. A predetermined number of queries may be hard coded based on, for example, hardware constraints or to avoid excessive guessing. Alternatively, the threshold may be determined as a function of the noise characteristics of the channel. If H is the Shannon entropy rate of the noise and the query abandonment threshold is set to $|B|^{n(H+\delta)}$ queries for some $\delta>0$, then when used with a random codebook it can be shown that an AML decoder is capacity achieving for large n and any value $\delta>0$, despite not being an ML decoder. In this connection, the abandonment threshold may be chosen to achieve a target abandonment probability while retaining the ability to achieve capacity. As mentioned in the background, combining the complexity benefits of the curtailing implemented in AML while retaining capacity achieving capabilities is novel and beneficial with respect to the state of the art.

Figure 2:
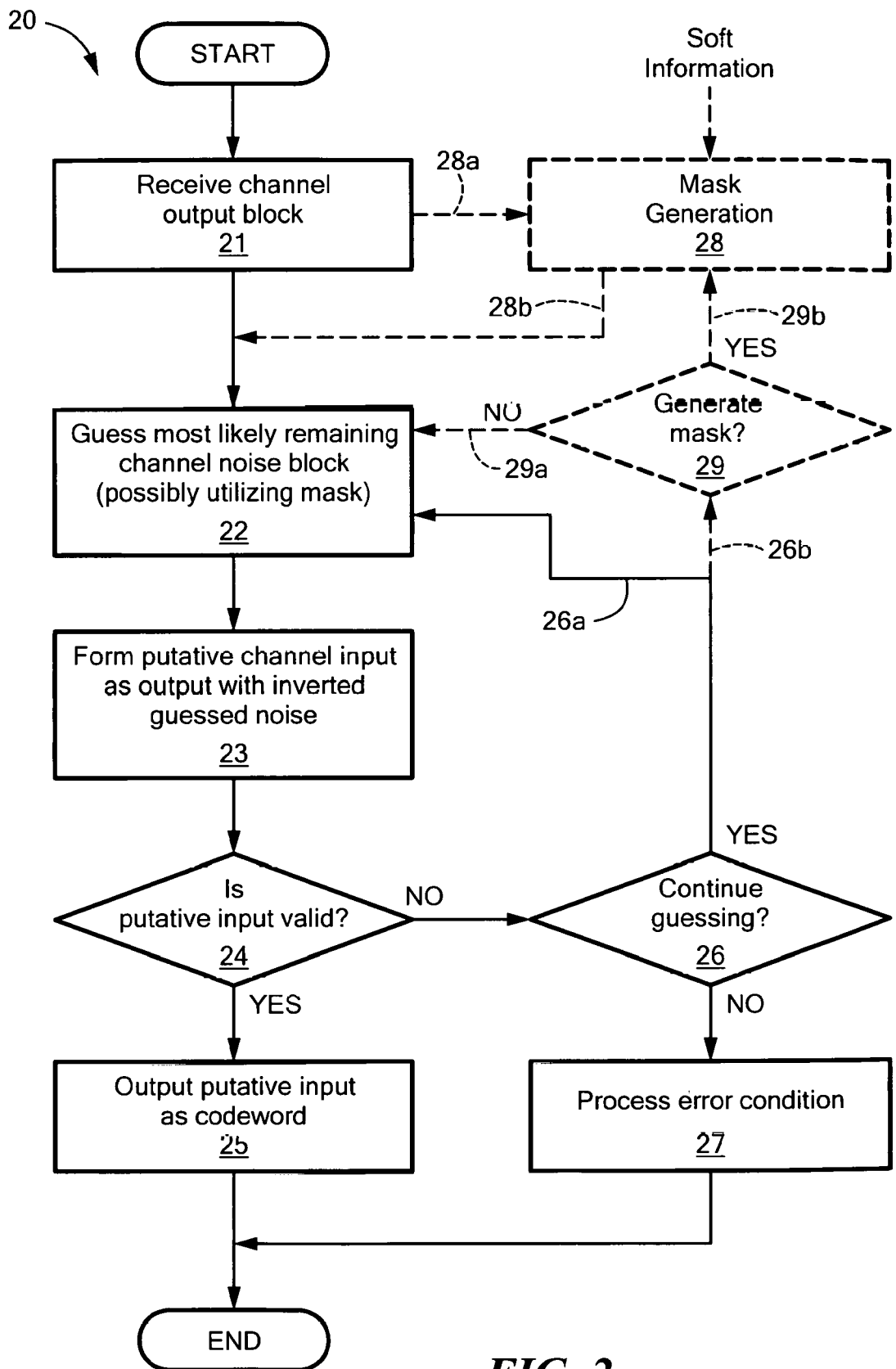
FIG. 2 is a flow diagram for a method of decoding data using noise guessing.

FIG. 2 is a flow diagram that illustrates processing that can be implemented within a device or system such as that illustrated in FIG. 1. Rectangular elements (typified by element 21 in FIG. 2), herein denoted "processing blocks," represent computer software instructions or groups of instructions. Diamond shaped elements (typified by element 24 in FIG. 2), herein denoted "decision blocks," represent computer software instructions, or groups of instructions, which affect the execution of the computer software instructions represented by the processing blocks.

The processing and decision blocks may represent processes or steps performed by functionally equivalent circuits such as a digital signal processor (DSP) circuit or an application specific integrated circuit (ASIC). The flow diagram does not depict the syntax of any programming language, but rather illustrates the functional information of one of ordinary skill in the art requires to fabricate circuits or to generate computer software to perform the required processing. It should be noted that many routine program elements, such as initialization of loops and variables and the use of temporary variables may be omitted for clarity. The sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order or in parallel.

In general overview, FIG. 2 illustrates one method 20 of decoding data, received from a data sender using a noisy data channel, through noise guessing. The data receiver may be, for example, data receiver 14 (FIG. 1), processing device 30 (FIG. 3), computer 40 (FIG. 4), or some other data receiver. The noisy channel may be data channel 16, or some other data channel. The method 20 may be performed by a single data receiver, or by many data receivers in parallel.

The illustrative method 20 begins with a receiving process 21, in which the data receiver receives a noisy channel output block. The receiving process 21 may be performed using techniques known in the art for receiving data from a channel.

The method 20 continues with a guessing process 22, in which the data receiver "guesses" a channel noise block. Such a block may, optionally, be the result of applying a mask (i.e. the decoder may use soft information for a given channel output to generate a symbol mask that identifies the collection of symbols that are suspected to differ from the channel input as noted above and described further below). It should be noted that no differentiation is made between a noise bock obtained without the application of a mask and a noise block resulting from the application of a mask, but may generically be referred to herein as a "noise block." This mask, generated by method 28, allows one to make use of soft information.

In one embodiment, to make a guess, the data receiver consults a noise model for which a likelihood estimate for each noise block may be (or has been) computed. The noise model may be probabilistic, for example a Markov model. Alternately, the noise model may be non-probabilistic, and may be determined using machine learning or inference. Of course, other such models may be used in various embodiments. This ability to incorporate readily in the decoding general behavior of the noise in the decoding is, as discussed in the background, novel and useful. Using this model, the data receiver orders the noise blocks in likelihood order, with the maximum likelihood (ML) noise block first, possibly with the application of a mask. Thus, in guessing process 22 the data receiver "guesses" the most likely noise block not already guessed.

The decoder may store the ordered noise blocks in a memory indexed by likelihood. This design permits the decoder to determine which noise blocks already have been guessed simply by storing the index number, advantageously reducing decoder complexity. In this way, a guess may be accomplished by retrieving the noise block at the index, then incrementing the index. In some embodiments, each of a number N of decoders stores its own index number, and a guess includes incrementing the memory index by N, thus gaining the advantages of parallelization.

In some embodiments, the data receiver may order noise blocks prior to performing the method of FIG. 2. The probability that a codeword will experience a noise error is low for most practical data channels, which are already designed to reduce noise. Thus, the most likely noise block likely is the zero block, and the most likely result is that the received sequence already is a codeword in the codebook.

The next most likely error, for example for a binary symmetric channel, is likely to be a single-bit error. Thus, the single-bit errors may be the next on the list to "guess". These errors themselves may have a likelihood order. For example, single bit errors at the end of a block may be more likely owing to lack of perfect synchronization between digital clocks of the data sender and data receiver, as mentioned before. Thus, the next most likely noise block would be the block beginning with all zeroes and ending with a single 1. It may be appreciated that other orderings are possible, and may be based on channel properties, whether known prior to, or during, performing the method of FIG. 2.

The method 20 continues with a noise reversing process 23, in which the data receiver forms a putative channel input codeword as the received channel output string with the effect of the guessed noise string inverted. Forming the putative channel input codeword may be done using known techniques in the art, such as subtraction circuitry if the noise function is additive. If the block comprises binary symbols, for example, then subtraction circuitry may include an exclusive-or (XOR) circuit.

The method 20 continues with a validity determining process 24, in which the data receiver determines whether the putative channel input codeword is valid. As described above, a codeword is valid when it is contained in the codebook shared between the data sender and the data receiver. Thus, if the codebook is defined extrinsically to the noise guessing module, the validity determining process 24 may include consulting a codebook memory to determine whether the putative channel input codeword is stored inside. Alternately, if the codebook is defined intrinsically, the validity determining process 24 may include determining whether the output of a binary function on the putative channel input codeword is true or false. Or, the method may not have direct access to the codebook at all, only an oracle indicating whether the putative channel input codeword is valid, thus providing the modularity and security benefits discussed previously. In this latter case, the validity determining process 24 may include querying the oracle for validity of the putative channel input codeword.

If the putative channel input codeword is valid, then the method 20 has obtained a termination condition for the loop and continues with an outputting process 25, in which the putative channel input codeword is determined to be the actual channel input codeword and output the codeword as such. Also, once the outputting process 25 is reached, the data receiver has determined the noise block that most satisfactorily explains the received sequence. The outputting process 25 thus optionally includes performing a function using this noise block. For example, the data receiver may store the noise block in a table indexed by received time, and later analyze the data stored in the table to update the ordering of noise blocks by, for example, an estimation technique such as calculating a likelihood by Bayesian inference. Other techniques may be used to update the ordering. Other embodiments of the concepts described herein may use these noise blocks to perform other analyses other than updating the ordering of noise strings, including via machine learning or outputting the noise strings to other devices to perform online machine learning, thus advantageously obviating the need for a full or explicit statistical description of the noise. In this manner, a decoder, or a larger system that includes the decoder, is able to learn from the channel outputs being observed.

If the putative channel input codeword is not valid, then the method 20 continues with a repeat determining process 26, in which the data receiver determines whether to continue guessing. In general, the criterion or criteria to make the determination may be tailored to the requirements of the data receiver or the application. For example, in some embodiments, the data receiver guesses noise blocks in order of decreasing likelihood, and there exists an abandonment point at which further noise guesses are unlikely to provide a correct decoding. Thus, the repeat determining process 26 may include determining whether this abandonment point has been reached, for example by incrementing a repetition counter when, preferably each time, the codeword validator attempts to validate a formed block of symbols and abandoning the search when the count reaches a maximum repetition threshold, or a time deadline has been reached, or a probability of error has been reached, or other criterion for abandonment has been met.

It is appreciated that some embodiments requiring additional security may be designed based on a decoding rate that corresponds to a noise ceiling. For example, in some physical environments channel noise is correlated to physical distance in a generally predictable manner where increasing distance renders the presence of noise more likely or the effect of the noise more severe. If it is known that an intended receiver is within a certain physical distance from the data sender but that an undesired receiver is further from the data sender, the codeword validator may assume a maximum amount of noise and reject less likely noise sequences. This corresponds to abandoning by omitting guesses beyond a threshold (e.g. a maximum threshold number of guesses). Using a noise ceiling, the desired receiver will obtain for each received sequence of symbols a codeword having a high likelihood (e.g. a maximum likelihood) of having been transmitted. Meanwhile, the undesired eavesdropper has a lower decoding rate and will therefore be unable to decide correctly with high probability among possible codewords. In this way, channel noise is used to enhance security.

If in decision block 26 a decision is made to continue guessing (e.g. if all relevant criteria to continue guessing are met), the method 20 returns to the guessing process 22 (e.g. as indicated via path 26a), to guess the next candidate noise block. Otherwise, the method 20 proceeds to an error handling process 27 in which the data receiver processes the failure to decode as an error condition. The breakeven point for further guesses may be determined as a function of the codebook, or of the channel properties, including general noise behavior and soft information. The error handling process 27 may include, for example, "decoding" the channel output as an erasure having all zeroes. Alternately, or in addition, the error handling process 27 may include producing a high- or low-voltage error or erasure signal on a circuit.

It should be noted that process 20 for decoding a signal having a codeword may optionally include the use of soft information by way of an optional mask provided via an optional mask generation process 28. The mask generation in 28 informs possibly the block guessing of process 22. It should be appreciated that the mask generation may or may not be based in whole or in part upon information received from receiving process 21 (and thus the arrow 28a denoting communication or transfer of information from receiving process 21 to mask generation block 28 is optional, as the mask may or may not be informed by information from receiving block 21). Mask generation 28 may have inputs from other processes, not shown in the figure, but that are readily expected/available as explained in conjunction with the description of mask generation provided herein. Similarly, guessing process 22 may have information from other processes not explicitly shown in the figure that area readily expected/available for use in accordance with the discussion on noise characterization provided herein.

It should be noted that the mask can be changed one or more times during operation of the decoder. That is, in some embodiments, the mask may not change. In other embodiments, however, the mask may change one or more times or even continuously change (or evolve) in response to the information available to a mask generator (i.e. a processing device capable of generating a mask operable to serve the masking purpose described herein). In embodiments, the mask may change prior to or concurrently with execution of guessing processing 22. Thus, in in embodiments, a plurality of different masks may be generated and used in accordance with a decoding process.

It should be appreciated that in embodiments, if in decision block 26 a decision is made to continue guessing, processing may optionally proceed to decision block 29 (e.g. via path 26b). In decision block 29 a decision is made as to whether a mask (or a new mask, if a mask had previously been used) should be generated. If in decision block 29 a decision is made to not generate a new mask, then processing proceeds to guessing process 22 (e.g. as indicated via path 29a) to continue guessing.

If, on the other hand, in decision block 29 a decision is made to generate a mask (or a new mask, as the case may be), then processing proceeds to mask generation process 28 (e.g. as indicated via path 29b) to generate a mask (or a new mask if a mask had previously been used). Upon generation of a mask (or a new mask, as the case may be) the mask is provided to guessing process as indicated by path 28b and used in the manner described herein.

Figure 2A:
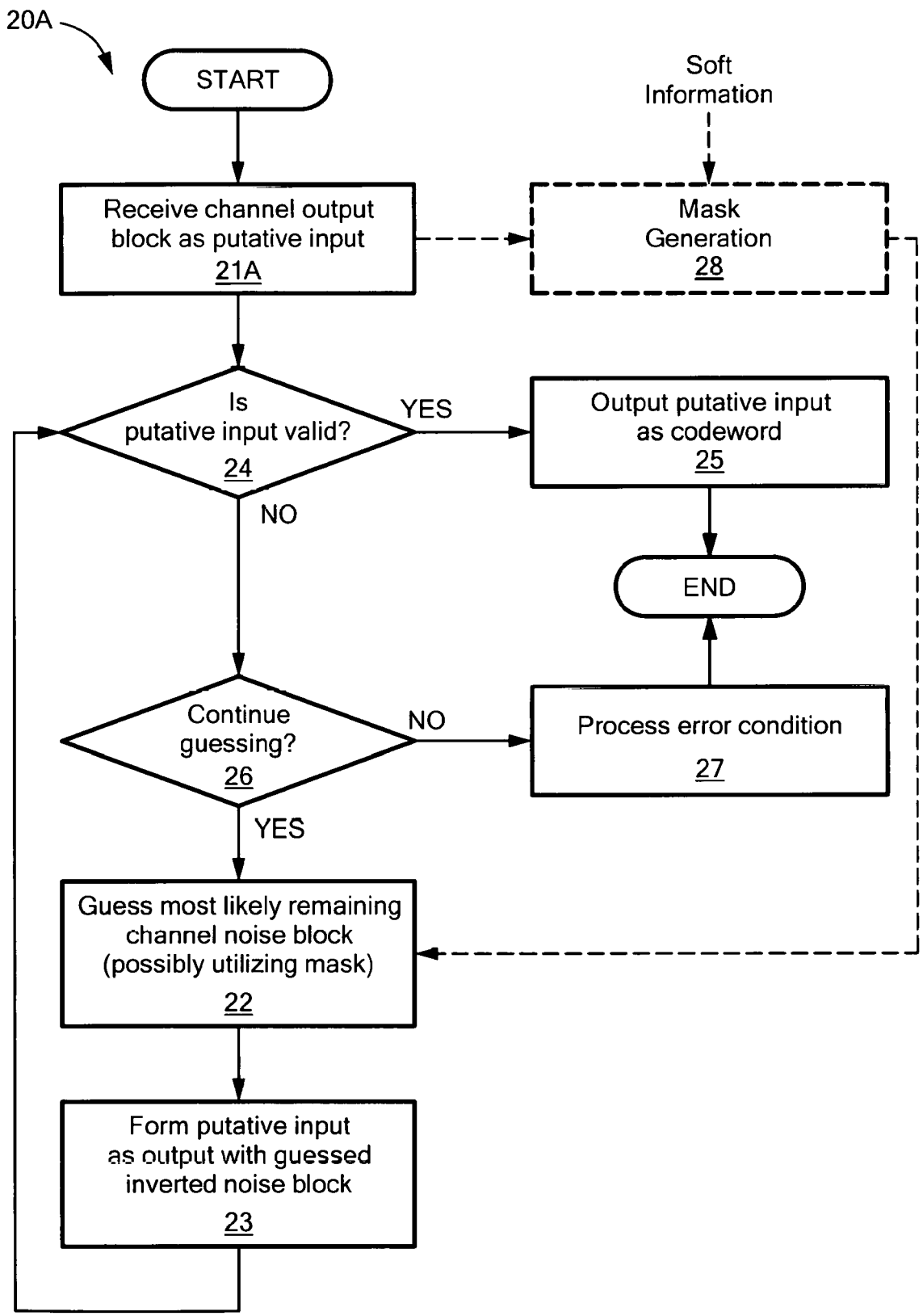
FIG. 2A is a flow diagram for an alternate method of decoding data though noise guessing.

Referring now to FIG. 2A, in which like elements of FIG. 2 are provided having like reference designations, an alternate method 20A is indicated for decoding a signal having a codeword. The method 20A of FIG. 2A is like the method 20 of FIG. 2, except that the processing of FIG. 2A includes determining whether the received channel output block is valid (thereby obtaining the termination condition) before guessing any noise blocks. This approach may streamline, i.e. make more efficient or even optimize, processing given that the most likely noise block is zero.

Thus, the method 20A begins as shown with a receiving process 21A by receiving a channel output block as a putative channel input codeword. Processing continues to the validity determining process 24, which as above may consult a stored codeword memory, a codeword-generating function, or an external codebook oracle for validity. If the putative channel input codeword is valid, then the method completes with the outputting process 25. If, in the validity determining process 24, a decision is made that the putative channel input codeword is not valid, then the data receiver determines whether to continue guessing with repeat determining process 26. If the data receiver determines to stop guessing, the method 20A concludes with error handling process 27. Otherwise, if the data receiver determines to continue guessing, the method 20A continues with guessing processes 22 (possibly under application of a mask provided in accordance with mask generation block 28), noise reversing process 23, and returns to validity determining process 24, as in the loop of FIG. 2. Note that, for at least the reasons described above in conjunction with FIG. 2, the mask generation may or may not be based in whole or in part on information from receiving process 21. Thus the arrow from receiving process 21 to mask generation block 28 is optional. It should be appreciated that mask generation 28 may have inputs from other processes, not explicitly shown in the figure, but that are readily expected/available as explained in conjunction with the description of mask generation provided herein. Similarly, guessing process 22 may or may not utilize mask information and thus the arrow from mask generation process 28 to guessing process 22 is optional. Guessing process 22 may receive information from other processes not shown in the figure that are readily expected/available (as described herein at least in connection with noise characterization). Again, as described above in conjunction with FIG. 2, it should be noted that a mask generated via mask generation processing block 28 can be changed during operation of a decoder.

As above, process 20A for decoding a signal having a codeword may optionally include the use of soft information by way of an optional mask generation process 28.

Figure 2B:
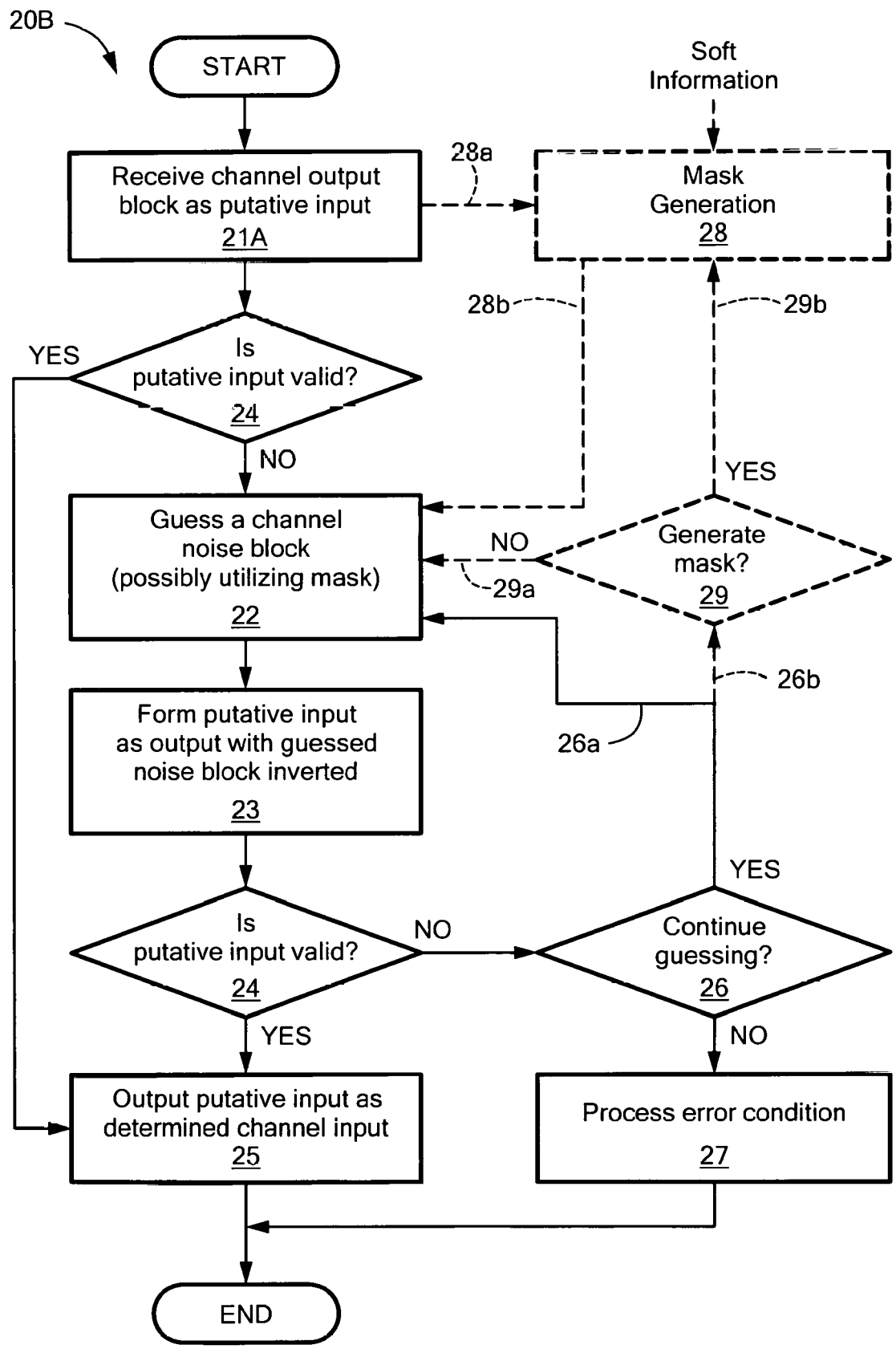
FIG. 2B is a flow diagram of yet another method of decoding data though noise guessing.

Referring now to FIG. 2B in which like elements of FIGS. 2 and 2A are provided having like reference designations, an alternate method 20B is indicated for decoding a signal having a codeword. The method 20B of FIG. 2B may thus be similar to method 20A of FIG. 2A in some respects, except that when the received channel output string is not a valid codeword, the processing of FIG. 2B requires guessing at least one noise string.

As above, process 20B for decoding a signal having a codeword may optionally include the use of soft information by way of an optional mask generation process 28. As noted above mask generation 28 informs possibly the block guessing of process 22. And as also noted above it should be appreciated that mask generation may or may not be based in whole or in part upon information received from receiving process 21A (and thus arrow 28a denoting communication or transfer of information from receiving process 21A to mask generation block 28 is optional, as the mask may or may not be informed by information from receiving block 21A). Mask generation 28 may have inputs from other processes, not explicitly shown in the figure, but that are readily expected/available as explained in conjunction with the description of mask generation provided herein. Similarly, guessing process 22 may have information from other processes not explicitly shown in the figure that area readily expected/available for use in accordance with the discussion on noise characterization provided herein.

It should be noted that a mask can be changed one or more times during operation of the decoder. That is, in some embodiments, the mask may not change. In other embodiments, however, the mask may change one or more times or even continuously change (or evolve) in response to the information available to a mask generator (i.e. a processing device capable of generating a mask operable to serve the masking purpose described herein). In embodiments, the mask may change prior to or concurrently with executing of guessing processing 22. Thus, in in embodiments, a plurality of different masks may be generated and used in accordance with a decoding process.

Thus, the method 20B begins as shown with receiving process 21A and validity determining process 24, just as in FIG. 2A. If the received channel output string is a valid codeword, then the method 20B has obtained a termination condition and continues to an outputting process 25 and concludes. Otherwise, the received channel output string is a not valid codeword, and the method 20B continues to the processes 22-27 as described above in conjunction with FIG. 2. In this connection, the processing of FIG. 2B is like that of FIG. 2, which also requires guessing at least one noise block.

If in decision block 26 a decision is made to continue guessing (e.g. if all relevant criteria to continue guessing are met), the method 20 returns to the guessing process 22 (e.g. as indicated via path 26a), to guess the next candidate noise block. Otherwise, the method 20 proceeds to an error handling process 27 in which the data receiver processes the failure to decode as an error condition. The breakeven point for further guesses may be determined as a function of the codebook, or of the channel properties, including general noise behavior and soft information. The error handling process 27 may include, for example, "decoding" the channel output as an erasure having all zeroes. Alternately, or in addition, the error handling process 27 may include producing a high- or low-voltage error or erasure signal on a circuit.

It should be appreciated that in embodiments, If in decision block 26 a decision is made to continue guessing, processing may optionally proceed to decision block 29 in which a decision is made as to whether a mask (or a new mask) should be generated. If in decision block 29 a decision is made to not generate a mask (or a new mask), then processing proceeds to guessing process 22 (e.g. as indicated via path 29a) to continue guessing.

If, on the other hand, in decision block 29 a decision is made to generate a mask (or a new mask), then processing proceeds to mask generation process 28 (e.g. as indicated via path 29b) to generate a mask (or a new mask if a mask had previously been used). Upon generation of a mask (or a new mask, as the case may be) the mask is used in the manner described herein in the guessing process as indicated by path 28b.

Figure 3:
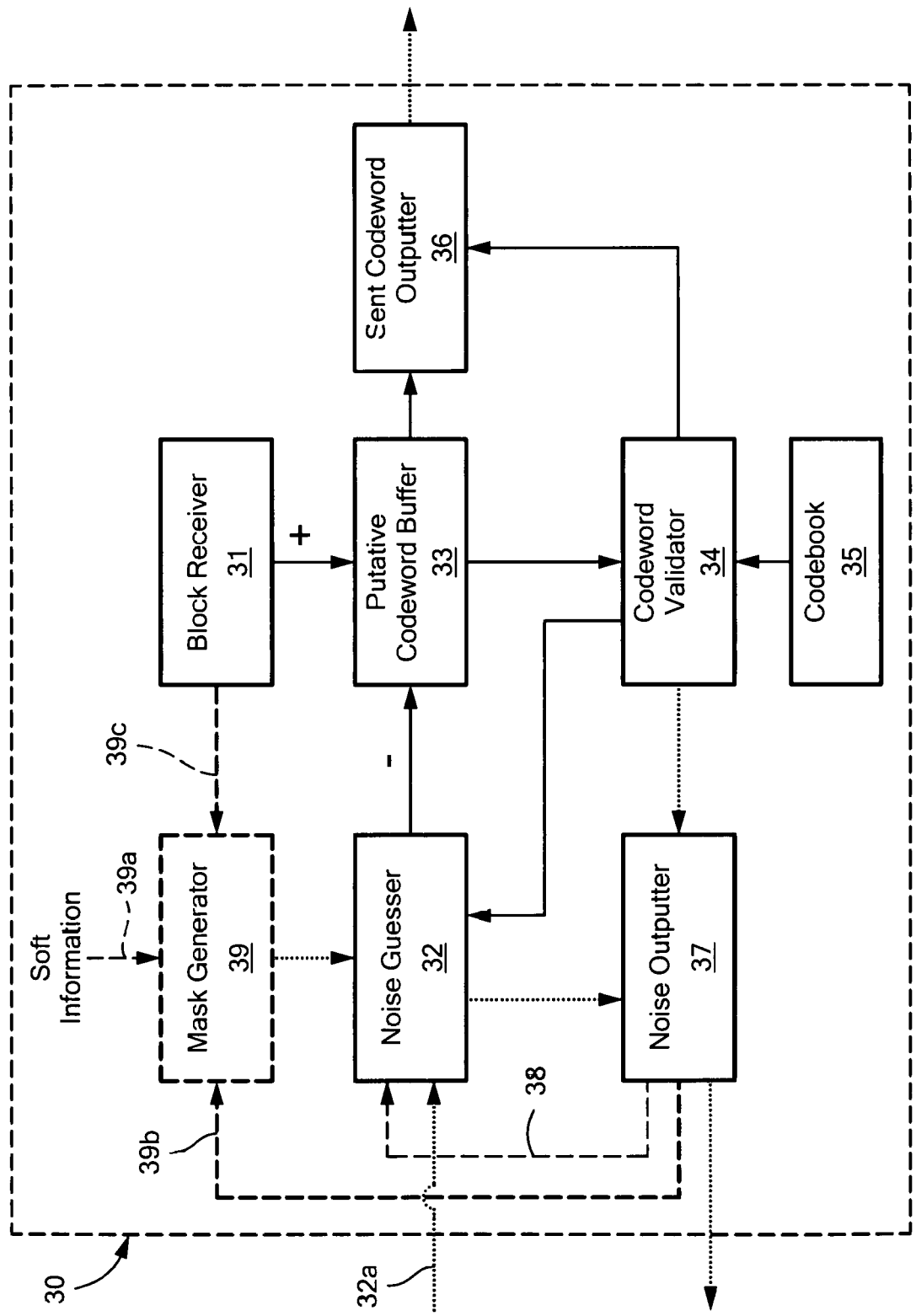
FIG. 3 is a schematic diagram of an illustrative receiving system which utilizes the guessing techniques described herein in conjunction with FIGS. 1-2B.

Referring now to FIG. 3, a device 30 which may, for example, correspond to an ML or AML decoder included in a receiver of the system described above on conjunction with FIG. 1 includes functional components that implement the processes shown in FIGS. 2-2B. Thus, the device 30 may be the data receiver 14, the computer 40 described below, or some other device.

The device 30 includes a block receiver 31 for receiving channel output blocks from a data channel. The block receiver 31 may be, for example, a network interface card (NIC) described below, or similar means. In some embodiments, the block receiver 31 performs the receiving process 21, the receiving process 21A, or both. It should be appreciated that in some embodiments, it may be desirable or even necessary, for noise guesser 32 to receive directly information (e.g. via exogenous input 32a) which may be useful to decode or at least assist in decoding. For example, any type of soft information or diagnostic information may be provided directly to the noise guesser 32.

The device 30 includes a noise guesser 32 for iteratively guessing noise blocks. The noise guesser 32 may be implemented, for example, using the CPU 511 and primary storage 415 described below, a custom integrated circuit, or similar means. In some embodiments, the noise guesser 32 performs the guessing process 22.

The device 30 includes a putative codeword buffer 33 for transiently storing putative channel inputs. The putative codeword buffer 33 may be, for example, primary storage, a volatile memory, or similar means. In some embodiments, the putative codeword buffer 33 stores the result of the computation of the noise reversing process 23. Thus, the putative codeword buffer 33 stores a channel output string received from the block receiver 31, with the reversed effect of a guessed noise string received from the noise guesser 32, as indicated in FIG. 3.

The device 30 includes a codeword validator 34 for validating putative channel inputs. The codeword validator 34 may be implemented, for example, using a CPU and primary storage, a custom integrated circuit, or similar means. In some embodiments, the codeword validator 34 performs the validity determining process 24. Thus, if the codeword validator 34 determines that the string stored in the putative codeword buffer 33 is a valid codeword, it may transmit a "success" signal to the noise guesser 32, and a sent codeword outputter 36 and noise outputter 37 described below. If not, the codeword validator 34 may transmit a "continue" signal to the noise guesser 32 that it should guess a next most likely noise string.

In some embodiments, the codeword validator 34 also performs the repeat determining process 26. Thus, the codeword validator 34 may determine that the device 30 should cease further attempting to guess noise strings. If so, it may transmit a "failure" signal to the noise guesser 32, the sent codeword outputter 36, and the noise outputter 37.

The device 30 may include an optional codebook 35 for use by the codeword validator 34. The codebook 35 may be implemented, for example, using primary storage, a volatile or non-volatile or programmable memory, or similar means. In some embodiments, the codeword validator 34 uses the codebook 35 to determine whether the string stored in the putative codeword buffer 33 is a valid codeword. If so, the codeword validator 34 transmits the "success" signal described above. In other embodiments, the optional codebook 35 is absent, and the codeword validator 34 performs a computational validation to determine whether the string stored in the putative codeword buffer 33 is a valid codeword. If so, the codeword validator 34 generates the "success" signal described above.

The device 30 includes a sent codeword outputter 36 for outputting channel input codewords sent by the data sender, as determined by the codeword validator 34. The sent codeword outputter 36 may be any coupling to another circuit or device (not shown) that performs further processing on the channel input codeword, as determined by the device 30. In some embodiments, the sent codeword outputter 36 performs the outputting process 25. Thus, the sent codeword outputter 36 outputs the block stored in the putative codeword buffer 33 upon receiving a "success" signal from the codeword validator 34.

In some embodiments, the sent codeword outputter 36 performs the error handling process 27. Thus, upon receiving a "failure" signal from the codeword validator 34, the sent codeword outputter 36 indicates the failure to the coupled circuit. Failure may be indicated, for example, by producing a high- or low-voltage error signal on the coupled circuit. Alternately or in addition, the sent codeword outputter 36 may transmit an erasure (e.g. a block of all zeroes or all ones), or diagnostic information about the error to the coupled circuit to permit the coupled circuit to diagnose the error. Such diagnostic information may include, for example, a count of how many tries to decode had been performed, or data indicating an ordering of the noise sequences. It should thus be appreciated that, while the technique described herein uses "soft information" obtained on receipt of the output block, it can potentially pass out another sort of soft information to the next layer up. In order not to confuse those two usages, the soft information passed to the next layer up is sometimes referred to herein as "diagnostic information" (in contrast to what is received through the transmission itself being referred to as "soft information").

The device 30 includes a noise outputter 37 for outputting channel noise strings, as determined by the codeword validator 34. The noise outputter 37 may be any coupling to another circuit or device (not shown) that performs further processing on the guessed noise block. The noise outputter 37 outputs the guessed noise block upon receiving a "success" signal from the codeword validator 34.

The noise guesser 32 optionally includes a function for analyzing noise strings, as indicated by the dashed line 38 from the noise outputter 37 to the noise guesser 32. Thus, in addition to outputting the guessed noise block to any coupled circuit, the noise outputter 37 may output the guessed noise block to the noise guesser 32.

The noise guesser 32, in turn, may analyze the guessed noise block, for example using machine learning, to learn patterns of the channel noise. The noise guesser 32 may then use these noise patterns to update its noise model and reorder the noise blocks. Such reordering may be accomplished, for example, in accordance with a likelihood order (e.g. a maximum likelihood order), and may be made using an estimation technique or a direct calculation technique. In some embodiments, the analysis includes training, where known input sequences are used to train the receiver on channel noise. Alternately or in addition, the analysis may include extrinsic information, such as feedback from the sender or from other decoders, to enable on-the-fly machine learning (i.e. real-time adaptive learning). The analysis, or a portion thereof, may be performed by a circuit coupled to the noise outputter 37, and the reordered noise guesses may be fed back into the noise guesser 32. Such a design advantageously simplifies the design of the noise guesser 32. The noise guesser 32 may optionally apply a mask provided from optional mask generator 39. The mask generator may use soft information obtained extrinsically (e.g. via path 39a) or intrinsically from the decoder (e.g. via any of paths 39b, 39c). Such an exogenous input for updating noise may come, for example, from changing the information regarding the modulation.

The device 30 includes an optional mask generator 39 for creating a mask for possible masking of the noise guesser 32. In some embodiments, the mask generator 39 performs the mask generating process 28. In other embodiments, the mask generator 39 is absent. The mask generator has an optional coupling to the block receiver 31, and/or an optional coupling to the noise outputter 37, and/or an optional coupling to the external coupling to a circuitry not shown.

Figure 4:
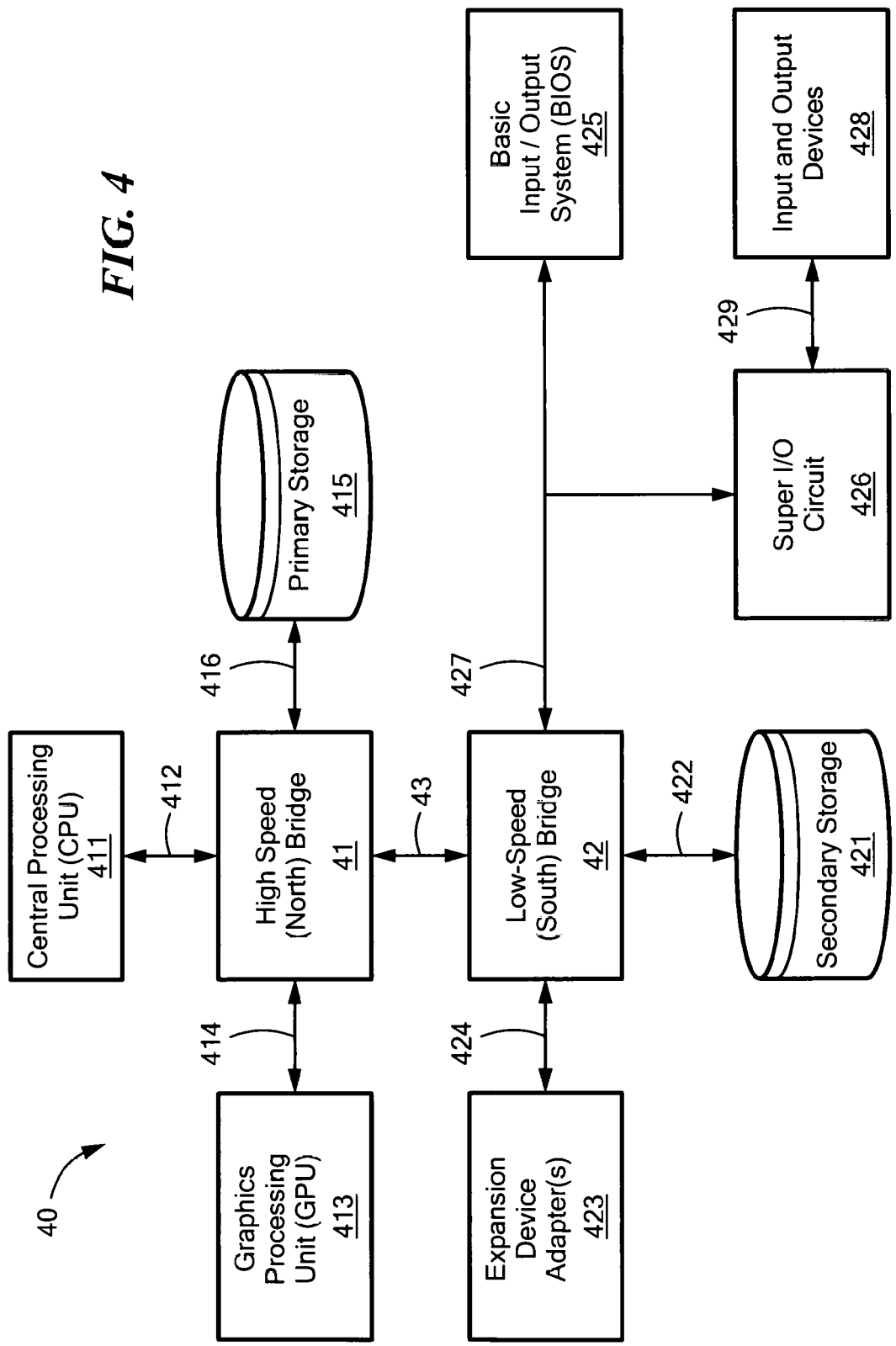
FIG. 4 is a schematic diagram of an illustrative processing system which may execute at least portions of the processing described above in conjunction with FIGS. 1-3.

FIG. 4 schematically shows relevant physical components of a computer processing system 40 embodiment of the concepts described herein, and their respective relationships. Generally, the computer 40 has many functional components that communicate data with each other using data buses. The functional components of FIG. 4 are physically arranged based on the speed at which each must operate, and the technology used to communicate data using buses at the necessary speeds to permit such operation.

Thus, the computer 40 is arranged as high-speed components and buses 411, 413-416 and low-speed components 421, 423, 425. 426. 428 and buses 422, 424, 427, 429 The high-speed components and buses are coupled for data communication using a high-speed bridge 41, also called a "northbridge," while the low-speed components and buses are coupled using a low-speed bridge 42, also called a "southbridge."

The computer 40 includes a central processing unit ("CPU") 411 coupled to the high-speed bridge 41 via a bus 412. The CPU 411 is electronic circuitry that carries out the instructions of a computer program. As is known in the art, the CPU 411 may be implemented as a microprocessor; that is, as an integrated circuit ("IC"; also called a "chip" or "microchip"). In some embodiments, the CPU 411 may be implemented as a microcontroller for embedded applications, or according to other embodiments known in the art.

The bus 412 may be implemented using any technology known in the art for interconnection of CPUs (or more particularly, of microprocessors). For example, the bus 412 may be implemented using the HyperTransport architecture developed initially by AMD, the Intel QuickPath Interconnect ("QPI"), or a similar technology. In some embodiments, the functions of the high-speed bridge 41 may be implemented in whole or in part by the CPU 411, obviating the need for the bus 412.

The computer 40 includes one or more graphics processing units (GPUs) 413 coupled to the high-speed bridge 41 via a graphics bus 414. Each GPU 413 is designed to process commands from the CPU 411 into image data for display on a display screen (not shown). In some embodiments, the CPU 411 performs graphics processing directly, obviating the need for a separate GPU 413 and graphics bus 414. In other embodiments, a GPU 413 is physically embodied as an integrated circuit separate from the CPU 411 and may be physically detachable from the computer 40 if embodied on an expansion card, such as a video card. The GPU 413 may store image data (or other data, if the GPU 413 is used as an auxiliary computing processor) in a graphics buffer.

The graphics bus 414 may be implemented using any technology known in the art for data communication between a CPU and a GPU. For example, the graphics bus 414 may be implemented using the Peripheral Component Interconnect Express ("PCI Express" or "PCIe") standard, or a similar technology.

The computer 40 includes a primary storage 415 coupled to the high-speed bridge 41 via a memory bus 416. The primary storage 415, which may be called "main memory" or simply "memory" herein, includes computer program instructions, data, or both, for use by the CPU 411. The primary storage 415 may include random-access memory ("RAM"). RAM is "volatile" if its data are lost when power is removed, and "non-volatile" if its data are retained without applied power. Typically, volatile RAM is used when the computer 40 is "awake" and executing a program, and when the computer 40 is temporarily "asleep", while non-volatile RAM ("NVRAM") is used when the computer 40 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 416 may be implemented using any technology known in the art for data communication between a CPU and a primary storage. The memory bus 416 may comprise an address bus for electrically indicating a storage address, and a data bus for transmitting program instructions and data to, and receiving them from, the primary storage 415. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 40 may use up to $8*2^{32}=32$ gigabytes (GB) of primary storage 415. In this example, the memory bus 416 will have a total width of 64+32=96 bits. The computer 40 also may include a memory controller circuit (not shown) that converts electrical signals received from the memory bus 416 to electrical signals expected by physical pins in the primary storage 415, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 411, the graphics processing units 413, the primary storage 415, and the high-speed bridge 41, or any combination thereof, as a single integrated circuit. In such embodiments, buses 412, 414, 416 may form part of the same integrated circuit and need not be physically separate. Other designs for the computer 40 may embody the functions of the CPU 411, graphics processing units 413, and the primary storage 415 in different configurations, obviating the need for one or more of the buses 412, 414, 416.

The depiction of the high-speed bridge 41 coupled to the CPU 411, GPU 413, and primary storage 415 is merely illustrative, as other components may be coupled for communication with the high-speed bridge 41. For example, a network interface controller ("NIC" or "network adapter") may be coupled to the high-speed bridge 41, for transmitting and receiving data using a data channel, such as data channel 416. The NIC may store data to be transmitted to, and received from, the data channel 416 in a network data buffer.

The high-speed bridge 41 is coupled for data communication with the low-speed bridge 42 using an internal data bus 43. Control circuitry (not shown) may be required for transmitting and receiving data at different speeds. The internal data bus 43 may be implemented using the Intel Direct Media Interface ("DMI") or a similar technology.

The computer 40 includes a secondary storage 421 coupled to the low-speed bridge 42 via a storage bus 422. The secondary storage 421, which may be called "auxiliary memory", "auxiliary storage", or "external memory" herein, stores program instructions and data for access at relatively low speeds and over relatively long durations. Since such durations may include removal of power from the computer 40, the secondary storage 421 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 422 may be implemented using any technology known in the art for data communication between a CPU and a secondary storage and may include a host adaptor (not shown) for adapting electrical signals from the low-speed bridge 42 to a format expected by physical pins on the secondary storage 421, and vice versa. For example, the storage bus 422 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 40 also includes one or more expansion device adapters 423 coupled to the low-speed bridge 42 via a respective one or more expansion buses 424. Each expansion device adapter 423 permits the computer 40 to communicate with expansion devices (not shown) that provide additional functionality. Such additional functionality may be provided on a separate, removable expansion card, for example an additional graphics card, network card, host adaptor, or specialized processing card.

Each expansion bus 424 may be implemented using any technology known in the art for data communication between a CPU and an expansion device adapter. For example, the expansion bus 424 may transmit and receive electrical signals using a Peripheral Component Interconnect ("PCI") standard, a data networking standard such as an Ethernet standard, or a similar technology.

The computer 40 includes a basic input/output system (BIOS) 425 and a Super I/O circuit 426 coupled to the low-speed bridge 42 via a bus 427. The BIOS 425 is a non-volatile memory used to initialize the hardware of the computer 40 during the power-on process. The Super I/O circuit 426 is an integrated circuit that combines input and output ("I/O") interfaces for low-speed input and output devices 428, such as a serial mouse and a keyboard. In some embodiments, BIOS functionality is incorporated in the Super I/O circuit 426 directly, obviating the need for a separate BIOS 425.

The bus 427 may be implemented using any technology known in the art for data communication between a CPU, a BIOS (if present), and a Super I/O circuit. For example, the bus 427 may be implemented using a Low Pin Count ("LPC") bus, an Industry Standard Architecture ("ISA") bus, or similar technology. The Super I/O circuit 426 is coupled to the I/O devices 428 via one or more buses 429. The buses 429 may be serial buses, parallel buses, other buses known in the art, or a combination of these, depending on the type of I/O devices 428 coupled to the computer 40.

Next described are techniques for utilizing so-called soft information in the guessing techniques described herein. These techniques in some embodiments would be applied in process 28 and/or in the mask generator 39.

Figure 5A:
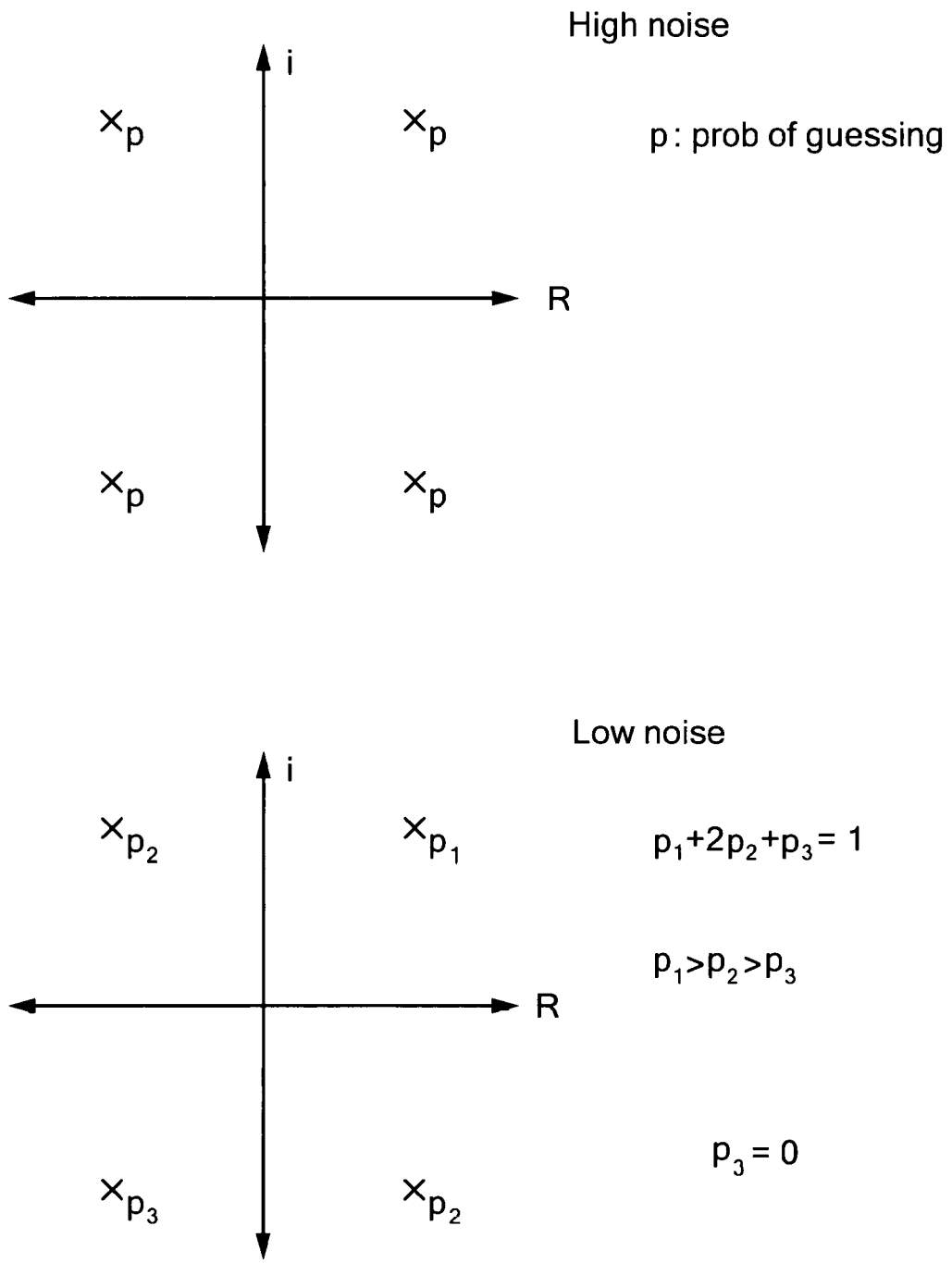
FIG. 5A is a representation of a quaternary constellation such as QAM.

Referring now to FIG. 5A, shown is a representation of a quaternary constellation such as quadrature amplitude modulation (QAM). FIG. 5A (and FIG. 5B) will be discussed below in conjunction with FIG. 8. FIG. 5A is an example of a constellation which may be provided from a bit stream modulated according to 4-QAM. Two cases of soft information regarding noise are illustrated. In the case of high noise, considering noise XOR operations to represent the effect of noise, the noises 00, 01, 10 or 11 all may have roughly the same likelihood. In the case of lower noise, the probability of having the nil noise 00 is highest, the probabilities of the noises 01 and 10 are lower, and the probability of the noise 11 the lowest.

Figure 5B:
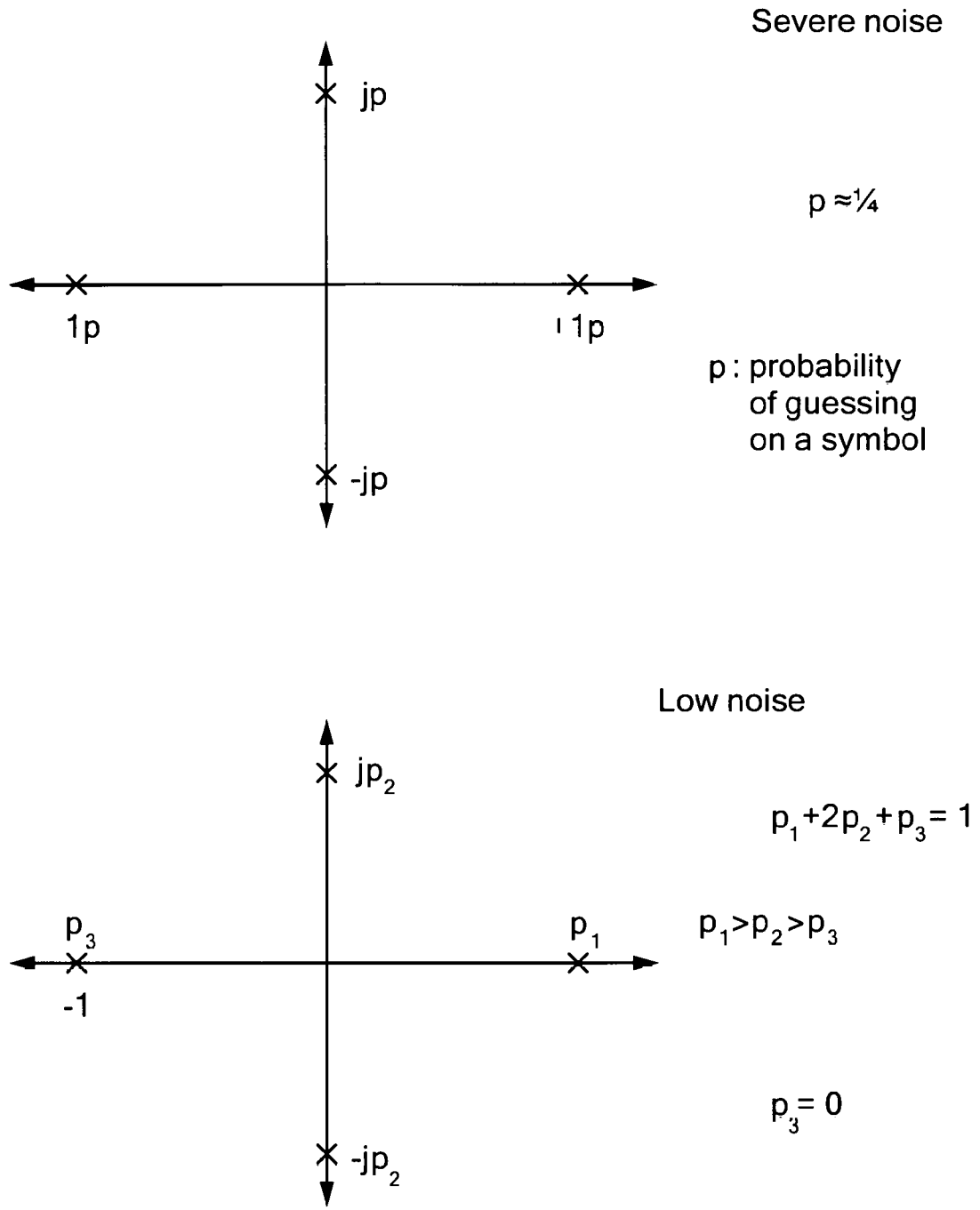
FIG. 5B is a representation of a quaternary constellation such as QPSK.

Referring now to FIG. 5B, shown is a representation of a quaternary constellation such as quadrature phase shift keying (QPSK). FIG. 5B will be discussed below in conjunction with FIG. 8. Suffice it here to say that FIG. 5B is an example of a constellation resultant from a bit stream modulated according to 4 QPSK. Two cases of soft information regarding noise are illustrated. In the case of high noise, considering noise XOR operations to represent the effect of noise, the noises 00, 01, 10 or 11 all may have roughly the same likelihood. In the case of lower noise, the probability of having the nil noise 00 is highest, the probabilities of the noises 01 and 10 are lower, and the probability of the noise 11 the lowest.

Figure 6:
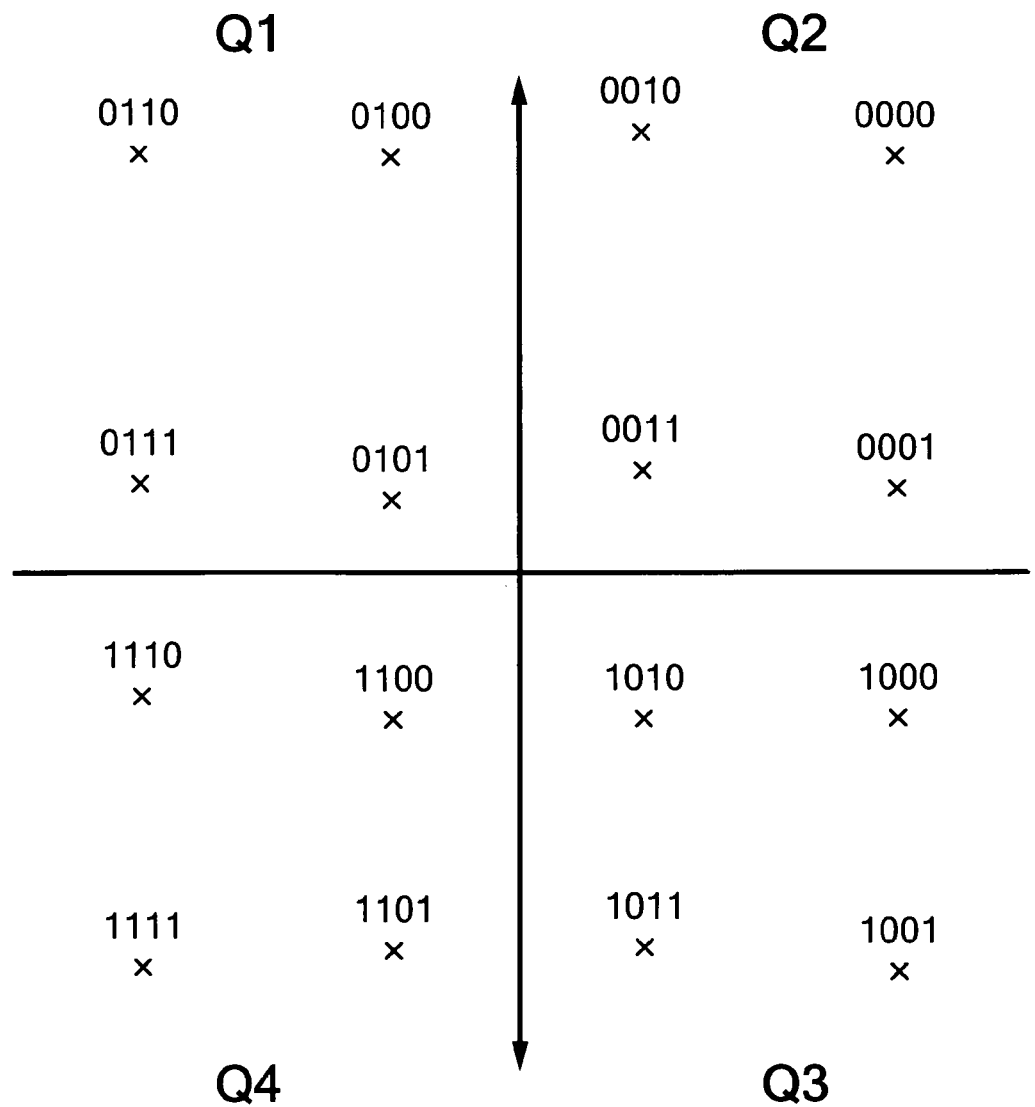
FIG. 6 is an illustration of a constellation such as 16 QAM and a binary representation of the points of that constellation.

Referring now to FIG. 6, shown is a representation of a constellation such as quadrature amplitude modulation (QAM). FIG. 6 will be discussed below in conjunction with FIG. 8. Suffice it here to say that FIG. 6 is an example of a constellation which may be provided from a bit stream modulated according to 16-QAM (e.g. each symbol in a bit stream is encoded by four bits). Two cases of soft information regarding noise are illustrated. In both of them the symbol 0000, in the upper right hand corner, is originally transmitted.

In the case of high noise, the likelihoods of noise effects mapping 0000 to any of the points in the lower right hand quadrant (Q2) or the upper left hand quadrant (Q3) are higher than the noises for Q1 and all roughly the same for any of the points in Q2 or Q3. The likelihood of noise effects mapping 0000 to any of the points in the lower left hand quadrant (Q4) is highest and roughly the same for any of the points in Q4.

In the case of low noise, the noise is differentiated further. For example, in FIG. 6, consider noise to be four bit symbols that affect via XOR operations bit-wise the four bit representations the 16-QAM input symbols shown. For the low noise, any noise 00XY (where the X and Y represent any bits) will be more likely for any X', Y', X', Y" than a noise 10X'Y' or 01X"Y" (which will have equal likelihoods), which will in turn be more likely, for any X''', Y'', than any noise 11X'''Y'''. In particular, the noise 1000 or 0100 is less likely than the noise 0011. In the same example, any noise XY00 (where the X and Y represent any bits) will be more likely than any noise XY01 or XY10 (which will have equal likelihoods), which will in turn be more likely than any noise XY11.

Figure 6A:
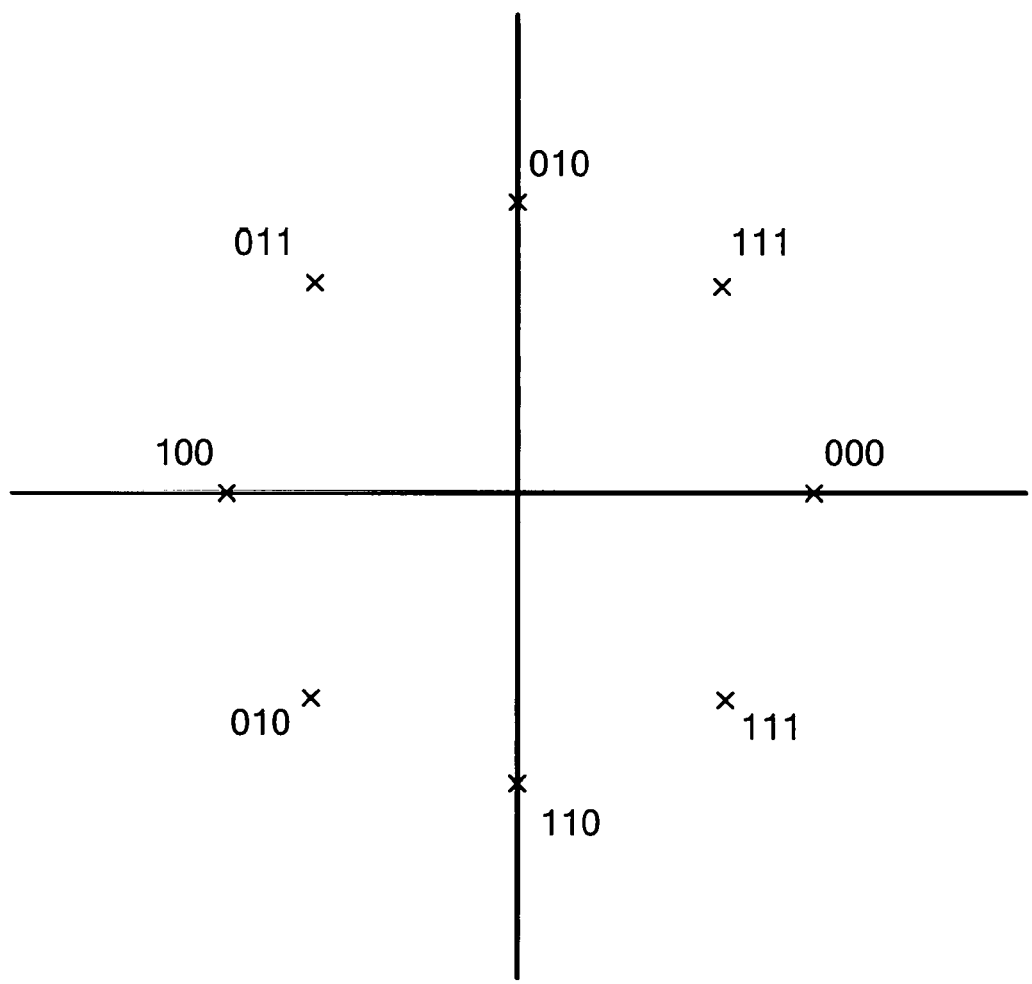
FIG. 6A is an illustration of a constellation such as 8 PSK and a binary representation of the points of that constellation.

Referring now to FIG. 6A, we show a representation of an 8-point constellation know as 8 Phase Shift Keying (8PSK). Each point in the constellation is represented by three bits using the standard representation, known in the art, in binary, of a numbers 0 . . . 7. Consider noise to be three bit symbols that affect, via addition modulo 8, the transmitted symbols. The most likely noise may be 0, represented by 000; the second most likely noise may be +1 or −1, represented by 001 and 111, respectively, modulo 8 in standard binary representation; the third most likely noise may be +2 or −2, represented by 010 and 110, respectively, modulo 8 in standard binary representation, the fourth most likely noise may be +3 or −3, represented by 011 and 101, respectively, modulo 8 in standard binary representation; and the least likely noise being +4 or −4, both represented by 100 modulo 8 in standard binary representation.

Figure 7A:
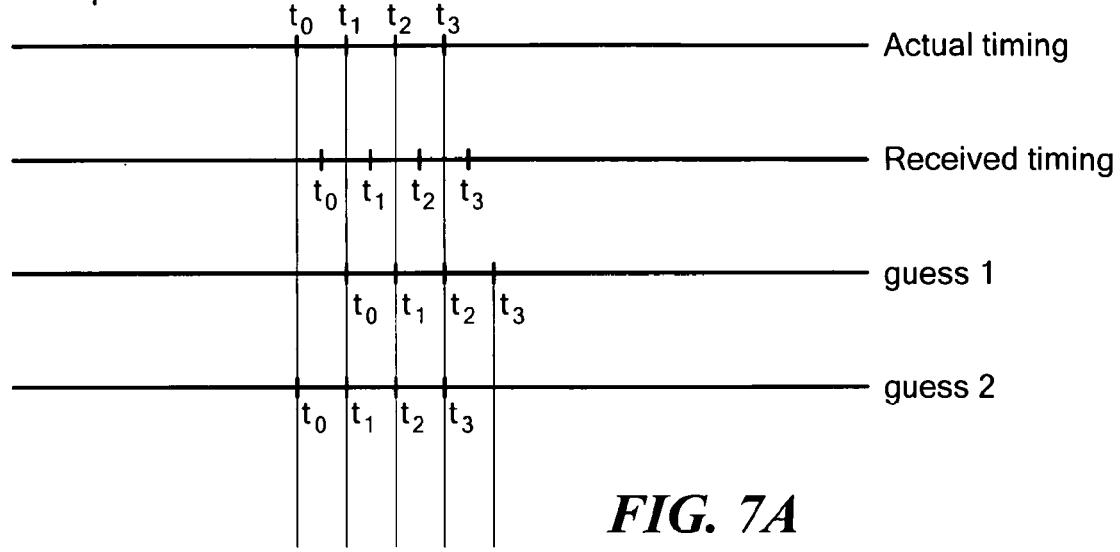
FIGS. 7A and 7B are timing diagrams which illustrate a use of soft information to decode symbols in the presence of a loss of timing information.
Figure 7B:
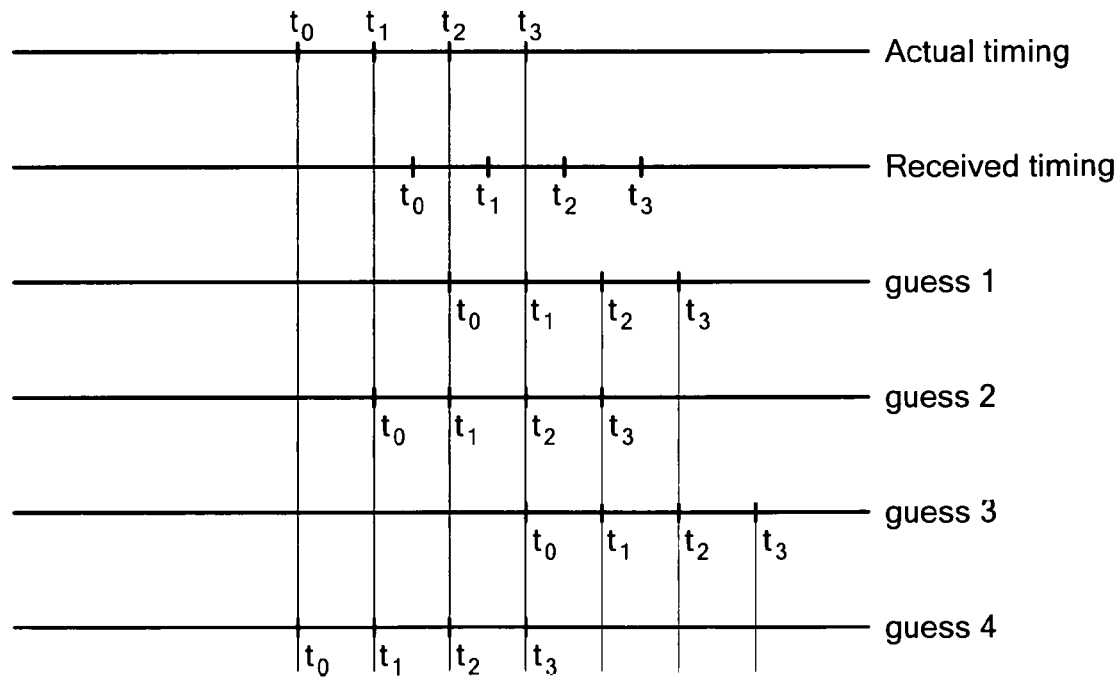

Referring now to FIGS. 7A and 7B, shown are examples of decoding symbols in the presence of timing noise. In this case the noise corresponds to shifts in time, which are inverted by the noise guesser through performing the opposite shift to the one experienced by the received stream.

Turning now to FIG. 7A, in a first example, actual timing of data transmission at four discrete points in time ($t_0$, $t_1$, $t_2$, $t_3$) is denoted 710. The vertical lines indicate the timing of time slots. Owing to slippage of timing at a receiver, timing noise occurs so that the receiver timing, denoted 715 the four discrete points in time ($t_0$, $t_1$, $t_2$, $t_3$) are not aligned with the actual timing 710. In this example, the soft information regarding the timing noise is that the received timing is more likely to be ahead of the real timing by a shift of less than a time slot. Thus, a receiver/decoder performs a first guess by sliding the received timing (i.e. the times $t_0$, $t_1$, $t_2$, $t_3$) forward one time slot, denoted 720.

As this guess does not result in correct alignment of received and actual timing (as can be seen by comparing timings 710 and 720) this guess will not result in a codeword. In this example, the soft information on the timing noise is that the second most likely timing shift is for the received timing to be behind of the real time by a shift of less than a time slot. Consequently, a second guess is made by sliding the received timing (i.e, the times $t_0$, $t_1$, $t_2$, $t_3$) back one time slot, denoted 725. As this guess does result in correct alignment of received and actual timing (as can be seen by comparing timings 710 and 725) this guess will result in a codeword (assuming the symbols are correct).

As noted above, it has been appreciated that loss of timing information in a system may play a deleterious role in the transmission and decoding of data and that soft information may be used to help address this problem. For example, decoding one or more digital shifts of a received sequence may be considered, possibly along with noise information. Soft information regarding timing noise at the receiver can be obtained by observing empirically a shift between received data and decoded data. In the example of FIG. 7A, the likelihood of the shifts between the actual timing and the received timing may have been obtained by observing that guessing shifts where the received timing is more likely to be ahead of the real timing by a shift of less than a time slot are the most likely to yield a correct decoding, and that guessing shifts where the received timing is more likely to be behind of the real timing by a shift of less than a time slot are the second most likely to yield a correct decoding. Guess decoding can use possible shifts in timing. For instance, decoding one or more digital shifts of a received sequence may be considered, possibly along with noise information. Thus, the use of soft information may reduce (and ideally may eliminate) the need to transmit training symbols to maintain timing. The transmission of training symbols consumes time and energy resources.

Turning now to FIG. 7B, in a second example, actual timing of data transmission at four discrete points in time ($t_0$, $t_1$, $t_2$, $t_3$) is denoted 730. Again, owing to timing noise, the receiver timing (denoted 735) of the four discrete points in time ($t_0$, $t_1$, $t_2$, $t_3$) are not aligned with the actual timing 730. In this example, the soft information regarding the timing noise is that the received timing is most likely to be ahead of the real timing by a shift of less than a time slot. Thus, a receiver/decoder performs a first guess by sliding the received timing (i,e, the times $t_0$, $t_1$, $t_2$, $t_3$) forward one time slot, denoted 740. As this guess does not result in correct alignment of received and actual timing (as can be seen by comparing timings 730 and 740) this guess will not result in a codeword. In this example, the soft information on the timing noise is that the second most likely timing shift is for the received timing to be behind of the real time by a shift of less than a time slot. Consequently, a second guess is made by sliding the received timing (i,e, the times $t_0$, $t_1$, $t_2$, $t_3$) back one time slot, denoted 745. As this guess also does not result in correct alignment of received and actual timing (as can be seen by comparing timings 730 and 745) this guess will also not result in a codeword. In this example, the soft information on the timing noise is that the third most likely timing shift is for the received timing to be behind of the real time by a shift of less than two time slots and more than one time slot. Consequently, the receiver/decoder performs a third guess by sliding the received timing (i,e, the times $t_0$, $t_1$, $t_2$, $t_3$) forward two time slots, denoted 750. As this guess also does not result in correct alignment of received and actual timing (as can be seen by comparing timings 730 and 750) this guess will not result in a codeword. In this example, the soft information on the timing noise is that the fourth most likely timing shift is for the received timing to be ahead of the real time by a shift of less than two time slots and more than one time slot. Consequently, a fourth guess is made by sliding the received timing (i,e, the times $t_0$, $t_1$, $t_2$, $t_3$) back two time slots, denoted 745. As this guess does results in correct alignment of received and actual timing (as can be seen by comparing timings 730 and 755) this guess will result in a codeword (assuming the symbols are correct after timing is corrected as described herein).

It should be appreciated that in this illustration, a technique in which guessed timing shifts alternate between forward and back shifts, but in other embodiments other techniques may be used. This is particularly true when soft information is used. As noted above in conjunction with FIG. 7A, soft information may indicate a preferred technique to determine how to address timing misalign. In the example of FIG. 7B, the likelihood of the timing noise may have been obtained by observing that the received timing is most likely to be ahead of the real timing by a shift of less than a time slot, the second most likely timing noise is for the received timing to be behind of the real time by a shift of less than a time slot, the third most likely timing noise is for the received timing to be behind of the real time by a shift of less than two time slots and more than one time slot, and the fourth most likely timing shift is for the received timing to be ahead of the real time by a shift of less than two time slots and more than one time slot.

Soft information measured directly or derived from detecting channel conditions or other conditions can be used to select symbols to guess and/or determine the order in which to guess them. For example, instantaneous signal-to-noise ("SNR") information can indicate which symbols are likely to have been affected by noise and hence are candidates for being in error, or are unlikely to have been affected by noise (are in the clear) and hence are candidates for being guessed as correct.

It should be noted that soft information may be obtained in a variety of ways. For example, soft information may be obtained by measuring an instantaneous signal-to-noise ("SNR") ratio of a channel over which data is transmitted. Soft information may also be obtained by requesting certain information from a data sender, or by other techniques known in the art. Soft information may be obtained, for example through such techniques as measuring receiver signal strength indicator (RSSI) in a chip, or by measuring a pilot tone from a beacon, or by observation of errors or timing shifts in a received known sequence, or by other iterative methods such as a Rake receiver or decision feedback equalizer (DFE).

Soft information may also be obtained or generated by developing statistics that pertain particularly to the noise guessing concepts, techniques, and structures disclosed herein. Examples of such statistics may include timing noise information, for instance garnered from measured delays over channels using sounding signals; or information about bursts of errors, for example information about interference leading to error bursts; of information about channel fading, for example from channel variations due to physical shadowing or multipath effects; or information about other effects, such as amplifier behavior, clock drifts, frequency hops, modulation effects or crosstalk.

A scheme making use of soft information provides one or more benefits including, but not limited to, improvements in rate, complexity, and/or decoding error probability (or its estimate).

To illustrate these benefits, consider a Binary Symmetric Channel ("BSC") having a predetermined Bit Error Rate ("BER") of 0.01. That is, on average, for every 100 bits received, one of those bits will be different than the corresponding bit that was transmitted. Now consider two cases: in the first case, all that is known is the overall, average BER of 0.01, while in the second case it is known that 90% of the bits are correct, but the error is concentrated in the 10% of the remaining bits, say each having an individual BER of 0.10. The information in the second case about the distribution of the errors, beyond merely their overall average, is called "side information" or "soft information".

Thus, in accordance with the concepts described herein, it has been recognized that using soft information in connection with noise guessing has various advantages, as now illustrated by comparing results for the above two cases.

Rate.

In the first case, the capacity may be determined as $1-H(0.01)=0.9192$, where $H(p)$ is the binary Shannon Entropy with parameter p (where p corresponds to the error rate). In the second case, capacity may be computed as $1-0.1 H(0.1)=0.9531$, which is superior to the capacity of the first case. Thus, the use of soft information results in a system having a channel capacity that is greater than a channel capacity of a system that does not utilize soft information. After reading the disclosure provided herein, one of ordinary skill in the art will appreciate how to generalize this example to other settings.

Algorithmic Complexity.

In the first case, the possibility exists that all received bits could be subject to disturbance by noise. For instance, if direct guesswork decoding is used, the number of queries that must be made for a received block of n bits until a correct decoding is approximately $2^{nD(0.01)}=2^{n\ 0.2618}$, where $D(p)=2\log_2(p^{0.5}+(1-p)^{0.5})$ is the binary Renyi Entropy with parameter 0.5 and argument p. In the second case only the $\frac{1}{10}$th of the bits liable to being in error would need to be considered for noise guessing purposes, so the number of queries that must be made for a received block of n bits until a correct decoding is approximately $2^{n/10\ D(0.1)}=2^{n\ 0.0678}$, which is preferable to (i.e. lower than) the number of queries required in the first case. After reading the disclosure provided herein, one of ordinary skill in the art will appreciate how to generalize this example to other settings.

Decoding Error Probability.

In the same example, the probability of error is reduced for the second case compared to the first case, as in the second case it may be known from the soft information that 90% of the bits are correct. Moreover, it has been found that the error probability after a given number of guesses is generally different for the two cases. Thus, the use of soft information results in estimates of error probability that are improved as compared to results that do not make use of soft information. Again, after reading the example provided herein, one of ordinary skill in the art will be able to generalize readily to other settings.

In illustrative embodiments of the concepts, techniques, and structures disclosed herein, the soft detection information is used to update noise probabilities. The updated new noise probabilities can be used so that, relative to the case where no soft information is available, fewer possible noise sequences need to be guessed, so that the relative likelihood of noise sequences may be changed, and the order in which they are guessed may be reordered.

Updating noise probabilities in illustrative embodiments is accomplished by using soft information to generate a symbol mask for selecting a portion of the received data on which to perform noise guessing, assuming that the data non-selected by the mask were correctly received by the decoder. Thus, by analogy to the second case described above, the symbol mask selects the 10% of the received bits for which the decoder has detected or inferred a reduced confidence of correctness. These embodiments of noise guessing then only need to guess symbols selected by the symbol mask.

By way of illustration, FIG. 8 is a representation of a symbol mask as applied to a bit stream 80 in accordance with an embodiment. Each symbol in the bit stream 80 comprises one or more bits. In this illustrative embodiment, the symbol mask 82 selects six such bits, namely bits 84a through 84f. It is appreciated that if each symbol in the bit stream 80 is encoded by a single bit, then the symbol mask 82 selects six symbols. However, if each symbol in the bit stream 80 is encoded by two bits (e.g. the bit stream is modulated according to 4-QAM as shown in FIG. 5A or QPSK as shown in FIG. 5B), then the symbol mask 82 selects only three symbols. Moreover, if each symbol in the bit stream 80 is encoded by four bits (as in 16-QAM as illustrated in FIG. 6), then the symbol mask 82 selects one symbol and a portion of either one or two other symbols, depending on the alignment of the symbol mask 82 with the symbols in the bit stream 80. It is appreciated that these concepts may be extended in an obvious way to other channel modulations and numbers of bits per symbol. Thus, in this illustrative embodiment, a guessing technique as described herein is applied only to the masked bits (e.g. bits 84a-84f in the example of FIG. 8) rather than to the entire bit stream. Reducing the number of bits on which guessing is performed reduces the processing (and thus the amount of time and other resources including energy) required to arrive at a code word. Note that the soft information may lead both to the manner of selecting the mask, and to the order of guessing, with, in the examples of FIGS. 5A, 5B and 6, different orders of noise corresponding to different cases.

By way of further illustration, FIG. 9 is a representation of a different symbol mask as applied to a bit stream 90 in accordance with an embodiment. Thus, in this illustration a single symbol mask 92 has three submasks, indicated as 92a, 92b, and 92c and at least some of the submasks are not contiguous. While the illustration represents bits, the discussion clearly applies to symbols of any kind.

Thus the decoder has determined based upon soft information that symbols in the submasks 92a, 92b, and 92c have an increased likelihood of being incorrect. That is, the likelihood of the symbols included in the mask being incorrect is (based upon soft information) deemed to be higher than the likelihood that the symbols outside the mask in the string are incorrect and application of the mask effectively results in having to decode a shortened code.

Although the submasks 92a, 92b, and 92c are not contiguous, in embodiments they are treated as a single mask 92 for purposes of applying the modified noise-guessing concepts and techniques described in connection with FIGS. 10 and 11.

Figure 10:
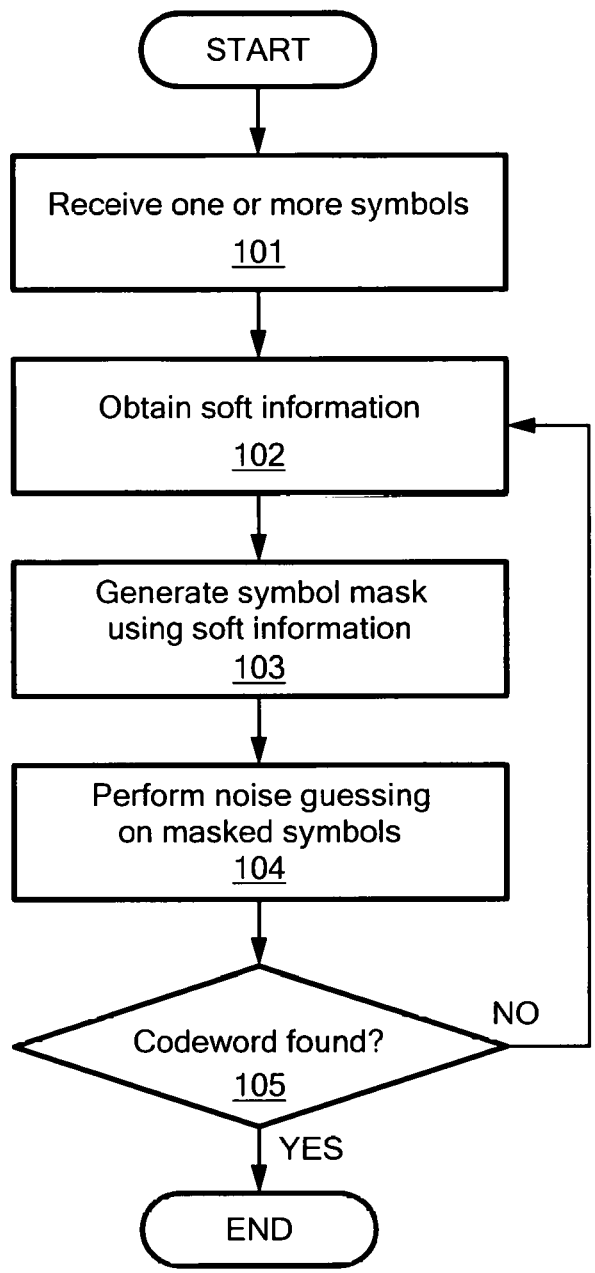
FIG. 10 is a flow diagram of a method of using soft information to generate a symbol mask in accordance with an embodiment.

FIG. 10 is a flow diagram of a method of using soft information to generate a symbol mask in accordance with an embodiment. The method begins with a process 101 receiving one or more symbols from a noisy data channel. The process 101 is similar to the receiving processes 21 and 21A shown in FIGS. 2, 2A, and 2B, and may be performed using similar techniques.

The method continues with a process 102 for obtaining soft information. The soft information may include, for example, instantaneous signal-to-noise ratios (SNR) of received symbols, or data pertaining to symbol timing slippage (i.e. loss of data synchronization between the sender and receiver). Other information may also be used. Thus, obtaining the soft information may include measuring the SNR of the noise data channel on a continual basis or detecting a data framing bit sequence. Alternately, in some embodiments the soft information is obtained by communicating with the data sender, as described below. Regardless of its source, the soft information indicates a measure of confidence for each symbol that the respective symbol was received without error.

Next, the process 103 includes generating a symbol mask using the soft information. The symbol mask selects bits (or symbols, depending on implementation) for which there is a likelihood of error that exceeds a given threshold. While the threshold is an algorithmic parameter, some embodiments may use the soft information to adjust the threshold itself. Thus, the process 103 selects a symbol mask such as those illustrated in FIGS. 8 and 9 to narrow down the range of bits or symbols that must be guessed.

Then, the process 104 performs noise guessing on the masked symbols only. That is, the process 104 is similar to processes 22 and 23 of FIG. 2, in that a noise guesser selects a sequence of noise symbols and a noise effect of the selected sequence on the received symbols is inverted. However, in accordance with illustrated embodiments, the sequence of noise symbols pertains only to the symbols selected by the symbol mask, not all of the received symbols. In this way, the complexity of the noise guessing algorithm may be significantly reduced. The process 104 continues until either a codeword is found or an abandonment threshold is reached, e.g. as discussed above in connection with AML decoding.

Abandonment thresholds may be selected such that an error and error information is reported if: more than average plus a margin number of symbols have been noise impacted; alternatively, if more queries have been made than the symbol alphabet size to the power of the average number of noise-impacted symbols times the Shannon entropy of the noise plus an arbitrary positive margin (which may be empirically selected); or if more queries have been made than the symbol alphabet size to the power of the number of noise-impacted symbols for this received sequence length times the Shannon entropy of the noise plus a margin; or any combination thereof. This margin may be selected by taking into account such factors as, for example, decoding time complexity, or processing energy, or decoding error probability.

Soft information itself may be used for adjusting the guessing abandonment thresholds of process 104. For instance, if only moderate noise is measured, in terms of SNR, for a quaternary system, only the three symbols closest to the received signal for that symbol are guessed (shown in FIG. 6). This alteration can occur whether guessing of noise is altered or not. Again, one of ordinary skill in the art will appreciate how to generalize to other settings after reading the disclosure provided herein.

The method continues to a decision 105 whether a codeword has been identified. It may be inefficient to allow the noise guessing process 104 to run to completion, so the noise guesser may determine that early termination is warranted.

The decision 105 determines whether the noise guessing process 104 was terminated early or not. If not, then a codeword (or list of codewords) was found, and the method of FIG. 10 ends. Otherwise, it may be that the symbol mask did not include a bit (or symbol) that was, in fact, incorrect, so it may be necessary to adjust the symbol mask. In this case the method returns to process 102 to obtain (or augment, or modify) the soft information so that the symbol mask may be adjusted.

Soft information may be augmented or modified based upon statistics learned or otherwise resultant from the guessing process. For example, in a case in which an instantaneous SNR range determination is used to include or exclude symbols from the mask, the ranges may be modified to lead to fewer guesses. In particular, for binary shift keying modulation, such ranges may consist of a single threshold. For instance, it may be that more values should be mapped to no noise effect if the assessment of the SNR was incorrect.

Summary statistics can be used to aid guessing. In the case of syndrome decoding, the syndrome is a type of summary statistic of the noise that based on the codebook construction. The syndrome may inform the guesswork order, leading to having multiple guesses where the syndrome is used to guide those guesses. In the case of Ordered Statistics Decoding (OSD), the summary statistics may be updated with multiple stages, again with use of the codebook. The guessing random noise algorithm employs ordered statistics of noise for decoding, but the codebook is only used when checking if a proposed decoded code word pertains to the codebook. The noise statistics may be obtained by arbitrary means and are not dependent on examining the decoder's output. This approach differs from Ordered Statistics Decoding (OSD), which uses the statistics derived from syndrome computations to update soft information in decoding linear bock codes, or from Turbo-style systems that blend decoding with soft information.

Other summary statistics may include, but are not limited to (1) a total estimated energy of the noise in a codeword; (2) reliability estimated by the number of steps required to acquire the channel at the receiver, for instance through the iterations of a Decision Feedback Equalizer (DFE) or a Rake receiver; and (3) hybrid summary statistics that combine codeword independent statistics, such as (1) and (2) above, with statistics from syndromes, including iterated syndrome techniques such as OSD.

In some embodiments, the soft information may be used to compute capacity. As a result of an increase in capacity due to soft information, one or more transmitters may be instructed to use codes with a higher rate (i.e. a rate which is increased with respect to a currently used rate). This can occur whether guessing of noise is altered, as in the first embodiment, or not.

In some embodiments, the soft information may be used to compute an updated probability of error of decoded codewords. For instance the soft information may lead to a lower decoding error probability estimate in the illustrative BSC. This can occur whether guessing of noise is altered, as in the first embodiment, or not, and with or without the rate adjustment of the second embodiment.

In some embodiments, soft information is used to guide the structure of guessing. For example, in a quaternary constellation, such as QAM (shown in FIG. 5A) or QPSK (shown in FIG. 5B), severe noise on one symbol may suggest that all four possibilities of that symbol should be guessed, whereas moderate may mean that only the three symbols closest to the received signal for that symbol are guessed. One of ordinary skill in the art will appreciate how to generalize to other settings after reading the disclosure provided herein.

Systems with multiresolution in transmission may use soft information to determine to which resolution to decode for different symbols. Such decoding may lead to lists, and those lists can have likelihoods derived from the soft information initially provided. For example, a symbol in a 16 QAM system might be decoded for some symbols to a quaternary system, where only quadrants are determined, and for other symbols to a 16 point system. This is an example that someone skilled in the art can readily generalize to other settings.

In many systems, loss of timing information plays a significantly deleterious role. Maintaining timing often requires the transmission of training symbols that consume significant time and energy resources. Soft information regarding slippage of timing at the receiver can be obtained by observing empirically the shift between a received signal and the decoded one. Guess decoding can use possible shifts in timing. For instance, decoding one or more digital shifts of the received sequence may be considered, possibly along with noise information. Two examples are shown in FIGS. 7A and 7B, as described above.

Hybrid automatic repeat request ("ARQ") may be used in conjunction with noise-guess based decoding. If the soft detection information is considered to be less than satisfactory on some symbols, some subsets of those symbols, or functions thereof, can be retransmitted, possibly coded, one or more times to allow refinement of the soft information. Examples of less than satisfactory soft detection information may include: soft information that leads to many guesses that do not result in codebook membership, or soft information that provides no time complexity benefit over decoding in its absence.

In a simple example, one may assume that some fraction f of received n bits have a probability of error of p and the rest have a probability of error of q, where p>q. A retransmission of the fraction of the n bits that have the higher probability of error, p, can lead to a higher effective SNR on those bits and, thus, an effective lower error probability, say p'<p. The rate without the retransmission is $f(1-H(p))+(1-f)(1-H(q))$. The rate with the retransmission is $[f(1-H(p'))+(1-f)(1-H(q))]/(1+f)$, which may be higher than the rate without the retransmission, depending on the values of p, p', q and f.

The information about the likelihood of which bits may be in error may have been derived from the code itself. For instance, coded checks may have been performed that identify that some symbols are highly likely not to be in error, thus leaving other symbols as candidates for being in error. One such example is G. Angelopoulos, M. Medard, A. Chandrakasan, "Partial Packet Recovery in Wireless Networks", U.S. Pat. No. 8,386,892, where parity checks are used to identify packets that are, with high likelihood, free of errors, and checks among packets, thus reducing the possible set of symbols that may be considered as candidates for being in error to those in packets with possible errors and groups of symbols that do not pass the among-packet code checks. Other code schemes that permit winnowing of the number of symbols that are in error, or differentiation of error probability, with or without detection soft information may be used.

Figure 11:
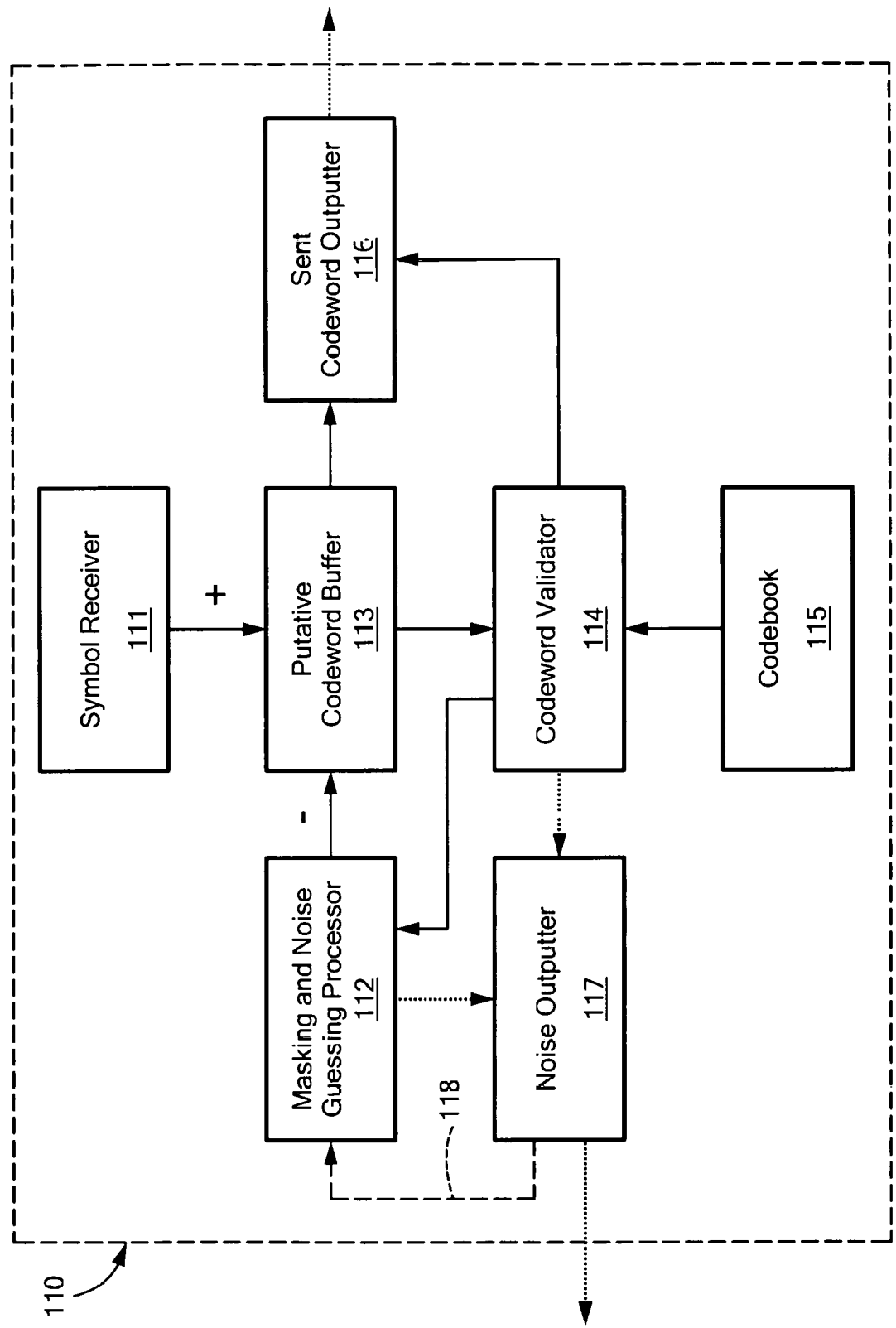
FIG. 11 is a schematic diagram of an illustrative receiving system which utilizes the guessing techniques described herein in conjunction with FIGS. 8-10.

FIG. 11 is a schematic diagram of an illustrative receiving system 110 which utilizes the guessing techniques described herein in conjunction with FIGS. 8-10. The device 110 may be, for example, the data receiver 14, the computer 40 described above, or some other device.

The device 110 includes a symbol receiver 111 for receiving channel output blocks from a data channel. The symbol receiver 111 may be, for example, a network interface card (NIC) described below, or similar means. In some embodiments, the symbol receiver 111 performs the receiving process 21, the receiving process 21A, or the receiving process 101.

The device 110 includes a masking and noise guessing processor 112 for iteratively guessing noise blocks. The masking and noise guessing processor 112 may be implemented, for example, using the CPU 411 and primary storage 415 described above, a custom integrated circuit, or similar means. In some embodiments, the masking and noise guessing processor 112 performs the guessing process 22, the symbol mask generation process 103, the noise guessing process 104, or a combination of these.

The device 110 includes a putative codeword buffer 113 for transiently storing putative channel inputs. The putative codeword buffer 113 may be, for example, primary storage, a volatile memory, or similar means. In some embodiments, the putative codeword buffer 113 stores the result of the computation of the noise reversing process 23 or noise guessing process 104. Thus, the putative codeword buffer 113 stores symbols received from the symbol receiver 111, with the reversed effect of a guessed, masked noise block received from the masking and noise guessing processor 112, as indicated in FIG. 11.

The device 110 includes a codeword validator 114 for validating putative channel inputs. The codeword validator 114 may be implemented, for example, using a CPU and primary storage, a custom integrated circuit, or similar means. In some embodiments, the codeword validator 114 performs the validity determining process 24, a portion of noise guessing process 104, or decision process 105. Thus, if the codeword validator 114 determines that the block stored in the putative codeword buffer 113 is valid, it may transmit a "success" signal to the masking and noise guessing processor 112, and a sent codeword outputter 116 and noise outputter 117 described below. If not, the codeword validator 114 may transmit a "continue" signal to the masking and noise guessing processor 112 that it should guess a next most likely noise block.

In some embodiments, the codeword validator 114 also performs the repeat determining process 26. Thus, the codeword validator 114 may determine that the device 110 should cease further attempting to guess noise blocks. If so, it may transmit a "failure" signal to the masking and noise guessing processor 112, the sent codeword outputter 36, and the noise outputter 37.

Unlike most existing decoders, disclosed embodiments can provide an operational separation between the part of the decoder that provides noise guesses and the part of the decoder that makes use of the codebook. In this way, there is compartmentalization between the functions of the decoder that might be able to parse the transmitted information and the part of the decoder that is intimately tied into the estimation of the noise. Thus, this results in a level of security which is greater than that achieved using prior art decoder techniques.

In one instance, soft detection information, which is generally tied to the process used for detection, may be in a separate module from the process of checking whether the codeword was correctly received.

In another instance, possibly in conjunction with the first instance, the checking may involve a cryptographic verification. The transmission might even not use an error-correcting code but only a cryptographic means of validation or verification, such as through a secure hash. In that case, guessing the noise, with or without soft information, is used to correct candidate error patterns in decreasing order of likelihood until validation occurs. In this case, errors may be corrected without the explicit use of an error correcting code. The hash value may reside at a receiver or at some other node, thus enabling security compartmentalization.

However, if security concerns or functional separation are not relevant, the device 110 of an embodiment may include an optional codebook 115 for use by the codeword validator 34. The codebook 115 may be implemented, for example, using primary storage, a volatile or non-volatile or programmable memory, or similar means. In some embodiments, the codeword validator 114 uses the codebook 115 to determine whether the block stored in the putative codeword buffer 113 is a valid codeword. If so, the codeword validator 114 transmits the "success" signal described above. In other embodiments, the optional codebook 115 is absent, and the codeword validator 114 performs a computational validation to determine whether the block stored in the putative codeword buffer 113 is valid. If so, the codeword validator 114 generates the "success" signal described above.

The device 110 includes a sent codeword outputter 116 for outputting channel input codewords sent by the data sender, as determined by the codeword validator 114. The sent codeword outputter 116 may be any coupling to another circuit or device (not shown) that performs further processing on the channel input codeword, as determined by the device 110. In some embodiments, the sent codeword outputter 116 performs the outputting process 25. Thus, the sent codeword outputter 116 outputs the block stored in the putative codeword buffer 113 upon receiving a "success" signal from the codeword validator 114.

In some embodiments, the sent codeword outputter 116 performs the error handling process 27. Thus, upon receiving a "failure" signal from the codeword validator 114, the sent codeword outputter 116 indicates the failure to the coupled circuit. Failure may be indicated, for example, by producing a high- or low-voltage error signal on the coupled circuit. Alternately or in addition, the sent codeword outputter 116 may transmit an erasure (e.g. a block of all zeroes or all ones), or "soft" information about the error to the coupled circuit to permit the coupled circuit to diagnose the error.

The device 110 includes a noise outputter 117 for outputting channel noise blocks, as determined by the codeword validator 114. The noise outputter 117 may be any coupling to another circuit or device (not shown) that performs further processing on the guessed noise block. The noise outputter 117 outputs the guessed noise block upon receiving a "success" signal from the codeword validator 114.

The masking and noise guessing processor 112 optionally includes a function for analyzing noise blocks, as indicated by the dashed line 38 from the noise outputter 117 to the masking and noise guessing processor 112. Thus, in addition to outputting the guessed noise block to any coupled circuit, the noise outputter 117 may output the guessed noise block to the masking and noise guessing processor 112. The masking and noise guessing processor 112, in turn, may analyze the guessed noise block, for example using machine learning, to learn patterns of the channel noise. The masking and noise guessing processor 112 may then use these noise patterns to update its noise model and reorder the noise blocks. Such reordering may be accomplished, for example, in accordance with a likelihood order (e.g. a maximum likelihood order), and may be made using an estimation technique or a direct calculation technique. In some embodiments, the analysis includes training, where known input blocks are used to train the receiver on channel noise. Alternately or in addition, the analysis may include includes extrinsic information, such as feedback from the sender or from other decoders, to enable on-the-fly machine learning. The analysis, or a portion thereof, may be performed by a circuit coupled to the noise outputter 117, and the reordered noise guesses may be fed back into the masking and noise guessing processor 112. Such a design advantageously simplifies the design of the masking and noise guessing processor 112.

Embodiments may include, for example, wireless systems having multiple antennas. Such embodiments may include transmission channels that incorporate multiple paths, each path receiving partial data, incomplete and/or noise-affected data. Embodiments performing noise-guess decoding over multiple channels are described in more detail below.

Next described are systems and techniques which operate with multiple channels.

Consider one or more channels for communication or storage of information, where a channel is a logical abstraction of any physical system that enables transmission of information. We envisage a system where data is mapped to a codeword c, which is a vector $(c_1, \ldots, c_n)$ of elements of an alphabet for transmission. For example, if the alphabet is binary each c takes the values 0 or 1. Sub-parts of each codeword c are transmitted over the channels and the codeword reconstructed via guess decoding, as described below.

Channels can, for example, represent different physical systems corresponding to different carriers in a multi-carrier wireless system or wired system. These channels can alternatively represent different wavelengths in optical communications. These channels may represent different sectors in disk storage system. Some of the channels may be belong to altogether different systems. For instance, some of them may be carriers in a WiFi system, while others may be carriers in a cellular system using OFDM, and some may be channels that do not have, or provide access to, carriers. For instance, we may have systems with channel bonding or multipath transmission, so that some of the channels may be OFDM carriers in a cellular system at 2.4 GHz, while others may be full channels on millimeter waves, while others may be satellite channels that do not allow direct access to their carriers. Some channels could represent different types of storage, such as disks or sectors on disks, while others may represent solid-state storage, of possibly varied types.

The modulation of each channel, which is the physical data representation of information over that channel, may be the same as, or different from, the alphabet of symbols over which the overall codebook used for communication or storage is constructed. Modulation over the physical channels may or may not be of different types, and the type of transmission or modulation may change over time.

The channels need not be used simultaneously. Labeling these channels C1, C2, through Ck, they may represent different uses in time of one or more channels for communication or storage. In particular, some C is may be different uses of the same channel.

Symbols from the codeword c are mapped via modulation to transmission symbols in some or all of the channels C1 through Ck. Let Ai denote the alphabet of transmitted symbols of channel Ci, which may be discrete or continuous. The mapping from all, or parts of, the codeword to the physically transmitted information can be done by one or more authorities. For instance, $c_1$ might be mapped to a transmission symbol in binary (say BPSK or OOK) in channel Ci, while $c_2, \ldots, c_6$ may be mapped to Cj which has 16 elements in Sj (say 16 QAM), and so on. This example is only illustrative and can readily extended to different codeword alphabets and different channels.

Note that a single physical means of transmission, sometimes termed "channel" might be mapped to multiple channels in our model. For instance, a wireless physical channel may transmit using different modulations, say a binary or a quarternary constellation. The same physical channel may have different signal to noise ratios at different times, leading to different channels corresponding to different times (note that we allow a single channel to have time varying signal to noise ratios).

Guess decoding can be then applied to the output of the channels that have been used for transmission by guessing noise that is composed of the noise experienced by the symbols transmitted on each of the channels. Note that these noises need not be independent.

After reading the disclosure provided herein, one of ordinary skill in the art can readily extend to the case where more than one codeword is transmitted over multiple channels. In that case, the guessing can be for multiple codewords simultaneously.

An additional technique may be applying guess decoding to one or more codewords received over one or more channels as described above. This allows a codeword to be transmitted over multiple channels without the current state of the art approach that uses distinct codebooks for distinct channels, with attendant delays and complexity.

Another technique includes using soft detection information (as described above) or other symbol error information (see below) received from one or more channels. For example assuming from the soft detection information that certain channels do not have errors, but that others might, so guessing only those subsets.

Another technique includes using characteristics of the guess decoding over one or more channels, such as speed of guess decoding or probability of error, as a criterion to select which channels to use and when. This includes features such as selecting modulations over channels.

Another technique includes deciding which channels to access for guess decoding, for instance to decide how many storage disk sectors to read. In one embodiment, further transmissions on wireless channels may be requested if the decoding is too slow, or yields too high a decoding error probability, for example as a result of high noise on one or more channels. This may be done in conjunction with list decoding, in which the set of channels to access may be determined by the desired size of the list. The decision may be combined with optimization techniques to consider the cost of use or access of channels and the benefit yielded by their use or access.

Another technique includes combining guess decoding with other types of decoding over multiple channels. Some channels might be decoded using other means, and the results from those decodings mapped to being channels with no noise in our guess decoding over multiple channels.

After reading the disclosure provided herein, it should now be appreciated that the techniques and structures described herein may be implemented in any of a variety of different forms. For example, features of the concepts described herein may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for streamlining the disclosure. This method of disclosure is not to be interpreted as reflecting an intention that the claimed concepts described herein require more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method, in a decoder, of decoding as a codeword a plurality of symbols received from a data sender using a noisy data channel, the method comprising:
    (a) generating, as a function of soft information, a symbol mask that identifies a subset of the plurality of symbols;
    (b) selecting, by a noise guesser according to both a noise guessing order and the symbol mask, a sequence of noise symbols previously unselected for the received plurality of symbols,
    (c) forming symbols by inverting a noise effect, of the selected sequence of noise symbols, on the received plurality of symbols in the subset, and
    (d) in response to the formed symbols comprising a codeword, obtaining a termination condition by a codeword validator; and
    (e) in response to obtaining the termination condition, outputting the codeword.

2. A method according to claim 1, further comprising repeating at least (b)-(e) until a termination condition is obtained.

3. A method according to claim 2, further comprising repeating (a)-(e) until a termination condition is obtained.

4. A method according to claim 1, wherein the soft information includes data that indicate, for each symbol in the plurality of received symbols, a measure of confidence that the respective symbol was received without error.

5. A method according to claim 2, wherein the measure of confidence is a function of any combination of: instantaneous signal-to-noise ratio, symbol timing slippage data, and channel performance summary statistics.

6. A method according to claim 1, wherein generating the symbol mask includes selecting the function of the soft information to reduce an algorithmic complexity of forming the symbols by inverting the noise effect.

7. A method according to claim 1, wherein generating the symbol mask includes selecting the function of the soft information to reduce a probability that the formed symbols comprise a codeword that differs from a codeword sent by the data sender.

8. A method according to claim 1, wherein generating the symbol mask includes selecting the function of the soft information to increase a measurable information-carrying capacity of the noisy data channel.

9. A method according to claim 1, wherein:
    generating the symbol mask includes generating a plurality of symbol masks, each such symbol mask according to a different number of bits;
    forming comprises forming a plurality of blocks of symbols, each such block of symbols consisting of symbols having a corresponding different number of bits; and
    obtaining the termination condition includes obtaining if any of the formed blocks of symbols is a codeword.

10. A method according to claim 1, wherein generating the symbol mask includes generating as a function of a channel model.

11. A method according to claim 10, wherein generating the symbol mask includes generating as a function of a type of channel modulation or timing slippage information.

12. A method according to claim 1, wherein obtaining the termination condition includes obtaining if a number of guesses reaches a given threshold before the formed symbols comprises a codeword.

13. A method according to claim 12, further comprising, in response to obtaining the termination condition, outputting an error signal.

14. A method according to claim 12, further comprising generating, as a function of the soft information, a second symbol mask that identifies a second subset of the plurality of symbols to be guessed.

15. A method according to claim 14, wherein generating the second symbol mask includes generating as a function of guessing hysteresis information.

16. A method according to claim 14, further comprising transmitting a request to the data sender, wherein generating the second symbol mask includes generating as a function of data responsive to the request.

17. A method of decoding as a codeword a plurality of symbols received from a data sender using a data channel, the method comprising:
    generating, as a function of soft information, a symbol mask;
    selecting, by at least one of a noise guessing order and the symbol mask, a sequence of noise symbols for the plurality of symbols received from the data sender;
    forming, in a buffer, a sequence of symbols by inverting a noise effect, of the selected sequence of noise symbols, on the plurality of symbols received from the data sender; and
    in response to the formed sequence of symbols corresponding to a codeword, obtaining a termination condition.

18. The method according to claim 17 wherein selecting comprises selecting according to both a noise guessing order and the symbol mask wherein the symbol mask identifies a subset of the plurality of symbols to be guessed.

19. The method according to claim 17 further comprising, in response to obtaining the termination condition, outputting the formed sequence of symbols as a decoded codeword.

20. A decoder comprising:
- a receiver configured to receive a plurality of symbols from a data sender using a data channel;
- a noise guesser configured to select, according to at least one of a noise guessing order and a symbol mask generated as a function of soft information, a sequence of noise symbols for the received plurality of symbols;
- a buffer configured to store a block of symbols formed by inverting a noise effect, of the selected sequence of noise symbols, on the received plurality of symbols;
- a codeword validator configured to obtain a termination condition when the formed block of symbols is a codeword; and
- an outputter configured to output the formed block of symbols as the decoded codeword in response to obtaining a termination condition.

21. The method of claim 17 wherein selecting comprises selecting a sequence of noise symbols previously unselected for the received plurality of symbols.

\* \* \* \* \*